US00RE44881E

(19) United States
(12) Reissued Patent
Sugiya et al.

(10) Patent Number: US RE44,881 E
(45) Date of Reissued Patent: May 6, 2014

(54) OPTICAL AMPLIFIER AND AN OPTICAL AMPLIFICATION METHOD

(75) Inventors: Hideaki Sugiya, Kawasaki (JP); Yoshihito Onoda, Kawasaki (JP)

(73) Assignee: Fujitsu Limited, Kawasaki (JP)

(21) Appl. No.: 10/686,514

(22) Filed: Oct. 16, 2003

Related U.S. Patent Documents

Reissue of:
(64) Patent No.: 6,373,624
Issued: Apr. 16, 2002
Appl. No.: 09/944,089
Filed: Sep. 4, 2001

U.S. Applications:
(62) Division of application No. 09/499,731, filed on Feb. 8, 2000, now Pat. No. 6,304,371, which is a division of application No. 08/828,556, filed on Mar. 31, 1997, now Pat. No. 6,118,576.

(30) Foreign Application Priority Data

Sep. 6, 1996 (JP) ..... 8-236042

(51) Int. Cl.
*H01S 3/30* (2006.01)
*H01S 3/09* (2006.01)

(52) U.S. Cl.
USPC ..... 359/341.4; 359/334

(58) Field of Classification Search
USPC ..... 359/341.4, 341.1, 341.3, 334
See application file for complete search history.

(56) References Cited

U.S. PATENT DOCUMENTS 5,355,248 A 10/1994 Hadjifotiou
5,363,385 A * 11/1994 Heidemann ..... 372/6
5,455,704 A 10/1995 Mizuochi et al.
5,471,334 A 11/1995 Masuda et al.
5,500,756 A 3/1996 Tsushima et al.

(Continued)

FOREIGN PATENT DOCUMENTS

EP 0 652 613 A2 5/1995
EP 0652613 5/1995

(Continued)

OTHER PUBLICATIONS

Notification of Reasons for Refusal mailed Aug. 17, 2004, in corresponding Japanese Application No. 236042.

(Continued)

*Primary Examiner* — Mark Hellner
(74) *Attorney, Agent, or Firm* — Staas & Halsey LLP

(57) ABSTRACT

Two rare earth-doped optical fibers are connected in series and used to amplify input light. A splitter is installed between these two rare earth-doped optical fibers. The input light is monitored by having the portion of the input light that is branched off, by the splitter received by a photodiode. Excitation light output from a laser light source is guided by optical couplers and supplied to the above rare earth-doped optical fibers. A control circuit controls the output light level and, at the same time, stops the output from the laser light source when the input light level drops below a specified threshold value. The gain of the first stage rare earth-doped optical fiber while excitation light is being supplied is larger than the loss that occurs due to branching of the input light by the splitter.

51 Claims, 17 Drawing Sheets

(56) References Cited

U.S. PATENT DOCUMENTS

| | | | | |
|---|---|---|---|---|
| 5,506,723 | A * | 4/1996 | Junginger | 359/341.3 |
| 5,535,037 | A | 7/1996 | Yoneyama | |
| 5,539,563 | A | 7/1996 | Park | |
| 5,673,142 | A | 9/1997 | Fatehi et al. | |
| 5,748,364 | A | 5/1998 | Meli et al. | |
| 6,118,576 | A | 9/2000 | Sugiya et al. | |
| 6,304,371 | B1 | 10/2001 | Sugiya et al. | |
| 6,373,624 | B1 | 4/2002 | Sugiya et al. | |

FOREIGN PATENT DOCUMENTS

| | | |
|---|---|---|
| EP | 0713273 | 5/1996 |
| GB | 2 272 102 A | 4/1994 |
| GB | 2272102 | 5/1994 |
| JP | 04-068830 | 3/1992 |
| JP | 05-48207 | 2/1993 |
| JP | 05-292036 | 11/1993 |
| JP | 06-112905 | 4/1994 |
| JP | 07-154329 | 6/1995 |
| JP | 07-301831 | 11/1995 |
| JP | 08-179388 | 7/1996 |
| WO | 97/12265 | 3/1997 |
| WO | 97/12265 | 4/1997 |

OTHER PUBLICATIONS

M. N. Zervas, et al. "Twin-Core Fiber Erbium-Doped Channel Equalizer"; Journal of Lightware Technology, vol. 13, No. 5, May 1995, pp. 721-722.
International Search Report of PCT/US96/14234.
European Search Report of EP 95 11 7855.
Office Action mailed Mar. 16, 1998 in U.S. Appl. No. 08/828,556.
Office Action mailed Aug. 25, 1998 in U.S. Appl. No. 08/828,556.
Advisory Action mailed Dec. 8, 1998 in U.S. Appl. No. 08/828,556.
Office Action mailed Jan. 11, 1999 in U.S. Appl. No. 08/828,556.
Notice of Allowance and Issue Fee Due mailed May 24, 1999 in U.S. Appl. No. 08/828,556.
Notice of Allowance and Issue Fee Due mailed Nov. 9, 1999 in U.S. Appl. No. 08/828,556.
Issue Notification (no. date) in U.S. Appl. No. 08/828,556.
Office Action mailed Sep. 12, 2000 in U.S. Appl. No. 09/499,731.
Office Action mailed Mar. 6, 2001 in U.S. Appl. No. 09/499,731.
Notice of Allowance and Issue Fee Due mailed Jun. 1, 2001 in U.S. Appl. No. 09/499,731.
Office Action mailed Nov. 19, 2011 in U.S. Appl. No. 09/944,089.
Notice of Allowance and Fee(s) Due mailed Jan. 10, 2002 in U.S. Appl. No. 09/944,089.
Notice of Publication of Application mailed Feb. 28, 2002 in U.S. Appl. No. 09/944,089.

* cited by examiner

OPTICAL AMPLIFIER AND AN OPTICAL AMPLIFICATION METHOD

Matter enclosed in heavy brackets [ ] appears in the original patent but forms no part of this reissue specification; matter printed in italics indicates the additions made by reissue.

This application *is a reissue of application Ser. No. 09/944,089, filed Sep. 4, 2001, which issued as U.S. Pat. No. 6,373,624 on Apr. 16, 2002. Application Ser. No. 09/944,089* is a divisional of Ser. No. 09/499,731, filed Feb. 8, 2000, now U.S. Pat. No. 6,304,371 which is a divisional of Ser. No. 08/828,556 filed Mar. 31, 1997, now U.S. Pat. No. 6,118,576.

BACKGROUND OF THE INVENTION

1. Field of the Invention

This invention relates to an optical amplifier. In particular, it relates to an optical amplifier that has a function for monitoring an input light level.

2. Description of the Related Art

The amount of information sent and received via networks is increasing rapidly. In addition, as the information becomes more international in character, the importance of long-range communications is rapidly increasing. In this kind of long-range transmission, particularly when a large amount of information is transmitted, optical fiber cables are used. However, when signals are transmitted via optical fibers, as the transmission distance increases, the signal is attenuated. For this reason, in long-distance optical transmission, relay nodes containing optical amplifiers are normally installed at specified intervals. The signal light is amplified at each node and then sent to the next node.

A number of types of optical amplifier have been developed. One of the types is the optical fiber amplifier. In particular, in the 1550 nm band, optical amplifiers using rare earth-doped optical fiber, into which rare earth elements such as erbium have been doped, are widely used. In a rare earth-doped optical fiber, the rare earth elements are excited by excitation light which is input apart from the signal light, and the signal light passing through the optical fiber is amplified by the excitation energy.

Some optical amplifiers have a mechanism to monitor the input light level. That is to say, the input light level is monitored and, whether or not its level drops below a threshold level is monitored. Conceivable reasons why the input light level might drop below the threshold include: (1) Light is not being output from the sending side, or is not arriving for some reason, such as the optical fibers are broken, (2) Although light is being output from the sending side, that light does not include a signal that contains information to be transmitted.

Thus, since, if light or a signal is not being transmitted, it is not necessary for the optical amplifier to amplify anything, the excitation light that excites the rare earth elements is stopped. This unit composition conserves the power used to drive the light source (normally a laser) that outputs the excitation light. In addition, since the amplification action inevitably generates noise, stopping the amplification action prevents the optical amplifier itself from becoming a noise source.

In an optical communication system that uses optical amplifiers, the noise that is generated in the different amplifiers accumulates. For this reason, in particular in a transmission area where many optical amplifiers are connected in series, it is necessary to suppress the amount of noise generated in each optical amplifier as much as possible. The amount of noise generated in an optical amplifier is expressed as the S/N (signal-to-noise ratio) of the output light relative to the S/N of the input signal, and is called the noise index.

In an optical amplifier having the above composition, the mechanism that monitors the input light level is one of the causes that prevents the noise level from being reduced. That is to say, in order to monitor the input light level, normally an optical splitter, for example, is used to branch off part of the input light; then the level of this branched-off part of the input light is detected by, for example, a photodiode, and the input light level is computed. For this reason, part of the input light is lost without being transmitted to the output side, causing the noise index to become worse. In particular, for example, if the transmission path on the input side is long, when the input light level is low, in order to measure that light level accurately, the amount of light that is branched off to the photodiode side must be kept at or above a certain fixed level, thereby decreasing the amount of light that is actually amplified for transmission and making the noise index even worse.

In order to deal with this problem, a configuration in which the input light level would be monitored indirectly has been proposed. That is to say, when the input light includes a signal, the input light is amplified while the excitation light power used to excite the rare earth elements is held fixed; the output light is branched off, and the level of the branched light is measured to compute the input light level. However, in this configuration, if the excitation light is stopped to conserve power when the input light does not include a signal, the input light is passing through an optical fiber which contains unexcited rare earth elements, in which case the attenuation (loss) will be large. For this reason, when the input light switches from not containing a signal to containing a signal, there is a danger that the monitoring mechanism on the output side of the optical amplifier will not be able to detect that change of condition. In this case, the excitation light is not output and the input light cannot be amplified. Consequently, in a configuration in which the input level is indirectly monitored by measuring the level of light output from the optical amplifier, it is necessary to constantly supply excitation light to the rare earth-doped optical fibers, preventing power from being conserved.

SUMMARY OF THE INVENTION

The aim of this invention is to provide an optical amplifier in which both power consumption and noise are low.

The optical amplifier of this invention is configured so as to control an amplification action depending on the input light level. It has an input monitor and first and second optical fiber amplifiers. The input monitor monitors the input light level. The first optical fiber amplifier is provided on the input side of the input monitor and amplifies the input light with a gain more than enough to compensate for the loss due to the input monitor. The second optical fiber amplifier is provided on the output side of the input monitor; it amplifies and then outputs light that has passed through the input monitor. The first and second optical fiber amplifiers both consist of optical fibers doped with rare earth elements.

The optical amplifier of this invention can be configured so as to additionally include a light source that supplies excitation light to the first and second optical fiber amplifiers, and a light source control unit which either stops the light source or reduces the output of that light source when the input light level detected by the input monitor is lower than a preset threshold value.

DETAILED DESCRIPTION OF THE INVENTION

Figure 1:
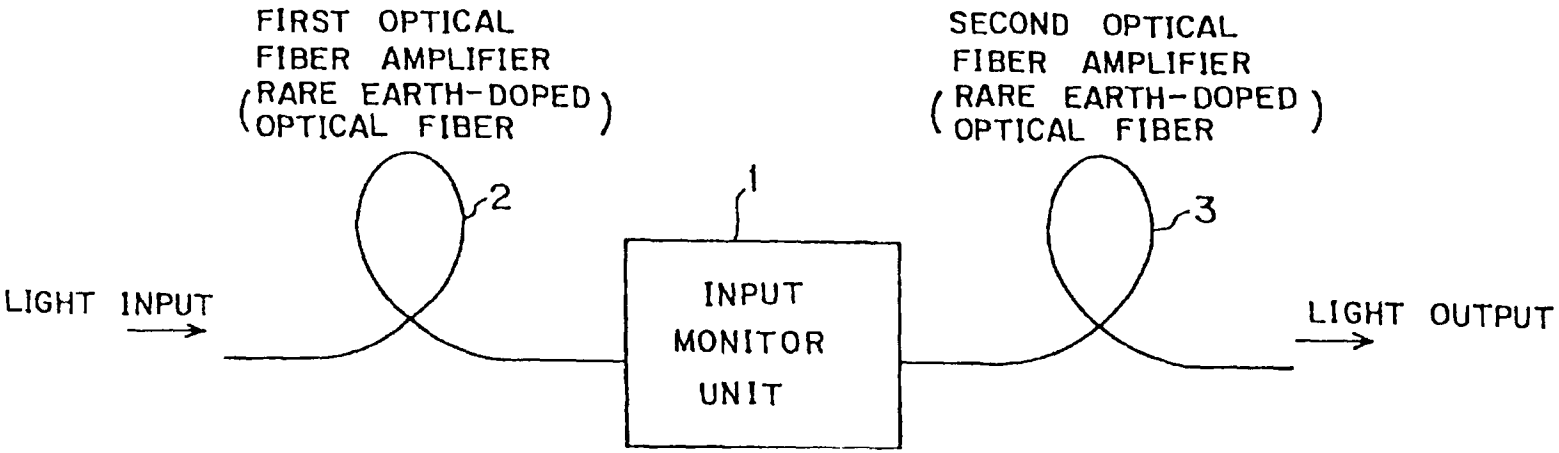
FIG. 1 is a diagram explaining the principle of this invention.

FIG. 1 is a diagram showing the configuration of the principle of the optical amplifier of this invention. The optical amplifier of this invention is required to be constructed so that the amplification action is controlled in accordance with the input light level.

The input monitor unit 1 monitors the input light level to this optical amplifier. The input monitor 1 branches off part of the input light and then computes the light level of the input light from the measured level of that branched-off portion of the input light, so that a certain amount of loss occurs.

The first optical fiber amplifier 2 consists of, for example, a rare earth-doped optical fiber. It is located on the input side of the input monitor unit 1, and amplifies the input light with a gain that is greater than the loss due to the input monitor unit 1. The first optical fiber amplifier 2 is an optical amplifier for the purpose of compensating for the loss that occurs in the input monitor unit 1. The second optical fiber amplifier 3 consists of, for example, a rare earth-doped optical fiber; it is located on the output side of the input monitor unit 1, and amplifies and then outputs the light that has passed through the input monitor unit 1. The second optical fiber amplifier 3 is an optical amplifier for the purpose of amplifying the output light to the desired level.

In the above configuration, the input light level can be monitored without causing loss on the input side of the second optical fiber amplifier 3.

In the above optical amplifier, there is (1) a light source that supplies excitation light to the first optical fiber amplifier 2 and the second optical fiber amplifier 3, and (2) a light source control unit that halts or reduces the output from the light source when the input light level detected by the input monitor unit 1 is lower than a preset threshold value. This keeps the loss in the first optical fiber amplifier 2 less than the difference between the minimum light level prescribed for the system in which this optical amplifier is installed and the minimum light level that can be detected by the input monitor unit 1 when excitation light is not being supplied.

In this configuration, even when excitation light is not being supplied to the first optical fiber amplifier 2, if the input light level is equal to or greater than the minimum light level prescribed for the system in which this optical amplifier is installed, the input monitor unit 1 can detect the input light level.

Now an embodiment of this invention will be explained. The optical amplifier of this embodiment is constructed so that input light is amplified using an optical fiber amplifier, excitation light supplied to the optical fiber amplifier is controlled to obtain light of the desired power. We discuss a rare earth-doped optical fiber as one form of an optical fiber amplifier. In addition, this optical amplifier has a function which monitors the input light level, and, when that input light level falls below a threshold value, judges that the input light does not contain a signal (or that light is not being transmitted to the amplifier) and halts (or reduces) the excitation light to conserve electric power.

Figure 2:
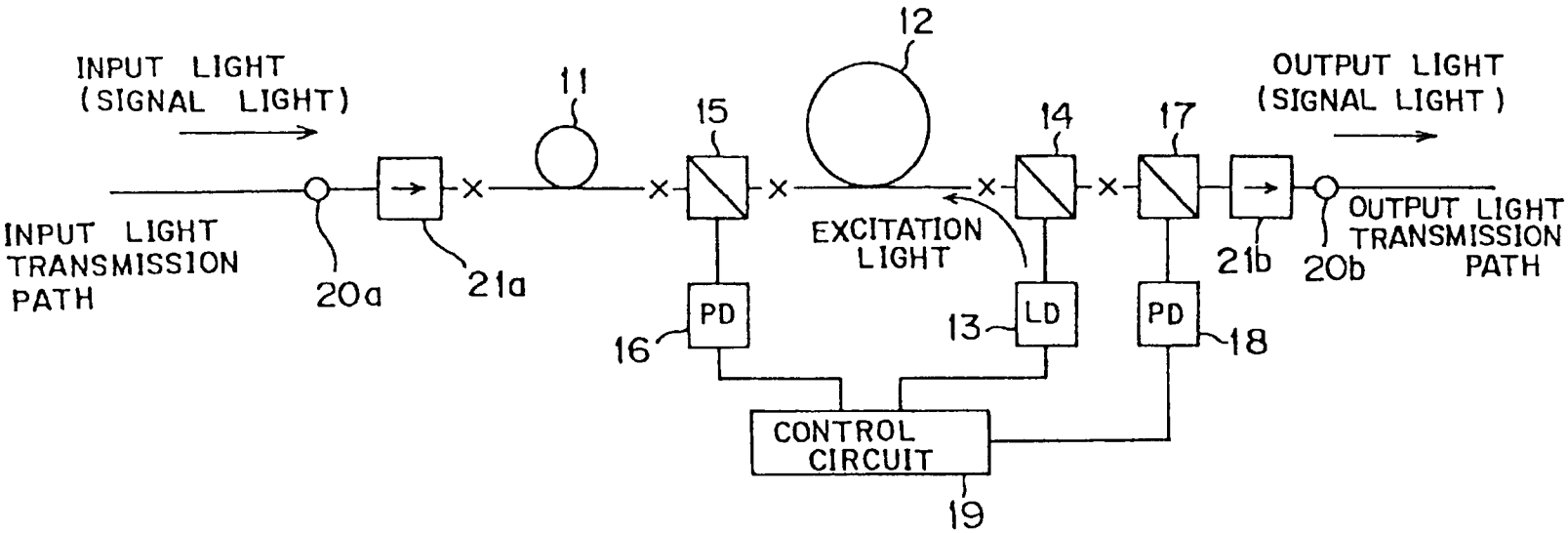
FIG. 2 is a schematic diagram of a configuration of an optical amplifier that is one embodiment of this invention.

FIG. 2 is a diagram of the configuration of the optical amplifier of one embodiment of this invention. In FIG. 2, the "X" marks show locations where optical fibers are fused together. It is also possible to use optical connectors or lens couplers to guide the light from one optical fiber to another instead of fusing the optical fibers together. An optical amplifier of this embodiment could, for example, be installed in a system which uses light in the 1550 nm band to transmit signals.

The rare earth-doped optical fibers 11 and 12 are optical fibers into which a rare earth substance such as erbium has been doped. When excitation light is supplied from the laser light source 13 to the rare earth-doped optical fibers 11 and 12, the doped rare earth substance undergoes inverted excitation and enters an excited state. When signal light passes through the rare earth-doped optical fibers 11 or 12 in this excited state, that signal light is amplified by the excitation energy. The rare earth-doped optical fiber 11 is an optical amplifier for the purpose of compensating for the loss that occurs in the mechanism that monitors the input light level. The rare earth-doped optical fiber 12 is an optical amplifier for the purpose of amplifying the output light to the desired level.

The laser light source 13 is, for example, a laser diode in the 980 nm band or the 1480 nm band (shown as LD in FIG. 2). The output power of the laser light source 13 is controlled by the control circuit 19. The excitation light output by the laser light source 13 is wave-guided by the optical coupler 14 and supplied to the rare earth-doped optical fiber 12. The optical coupler 14 is, for example, a fiber type or multilayer induction film WDM coupler (a wavelength division multiplexing coupler). It couples waves in the 980 nm band and the 1550 nm band, or in the 1480 nm band and the 1550 nm band. After this excitation light passes through the rare earth-doped optical fiber 12, it passes through the splitter 15 and is supplied to the rare earth-doped optical fiber 11.

The splitter 15 branches part of the input light (signal light) off to the photodiode 16 so that the input light level can be monitored. The splitter 15 can consist of, for example, an optical coupler or a beam splitter. The branching ratio of the splitter 15 is, for example, 10:1. The photodiode 16 receives the part of the input light that is branched off by the splitter 15 and converts the light level into an electrical signal which is input to the control circuit 19.

The splitter 17 branches off part of the output light (signal light) to the photodiode 18 in order to monitor the output light level. The splitter 17, like the splitter 15, can consist of, for example, an optical coupler or a beam splitter. The photodiode 18 receives the part of the output light branched off by the splitter 17, then converts that light level into an electrical signal and inputs it to the control circuit 19.

The control circuit 19 judges the input light level based on the electrical signal received from the photodiode 16, and judges the output light level based on the electrical signal received from the photodiode 18. The control circuit 19 controls the laser light source 13 based on the measured input light level and output light level. That is to say, when the input light level is higher than a certain preset threshold value, the control circuit 19 drives the laser light source 13 causing the laser light source 13 to output excitation light. At this time, the rare earth-doped optical fibers 11 and 12 amplify the input light. On the other hand, when the input light level falls below the threshold level, the control circuit 19 stops driving the laser light source 13 (or drives it at a lower level). In addition, the control circuit 19 holds the output light level constant, for example, by means of an ALC (Automatic Level Control) function.

Normally, the optical level (intensity) of the transmitted light is higher when it contains a signal than when it does not contain a signal. The "threshold level" mentioned above is a reference level for the purpose of judging whether the input light received in the input section of the optical amplifier contains a signal or not. This reference level can, for example, be preset according to the length of the input side light transmission path.

The connectors 20a and 20b are optical connectors which connect the light transmission paths on the input and output sides, respectively, to the optical amplifier of this embodiment. The optical isolators 21a and 21b are installed to prevent the optical amplifier from oscillating or going into unstable operation due to reflections in the connectors 20a and 20b.

Short optical fibers are used for the respective connections between the connector 20a and the optical isolator 21a, between the optical isolator 21a and the rare earth-doped optical fiber 11, between the rare earth-doped optical fiber 11 and the splitter 15, between the splitter 15 and the rare earth-doped optical fiber 12, between the rare earth-doped optical fiber 12 and the optical coupler 14, between the optical coupler 14 and the splitter 17, between the splitter 17 and the optical isolator 21b, and between the optical isolator 21b and the connector 20b. These optical fibers cannot be bent sharply and each optical fiber has to undergo processing of excess length, so, considering the problem of fitting them into the available space, it is desirable for the number of optical fibers that have to be installed inside the optical amplifier to be kept small. If, for example, among the optical fibers listed above, the optical fibers which are provided between the rare earth-doped optical fiber 11 and the rare earth-doped optical fiber 12 also consist of rare earth-doped optical fibers, the space required for optical fibers inside the optical amplifier can be kept small.

Next, the action of the optical amplifier with the above configuration will be explained. Signal light (input light to the optical amplifier) that has been transmitted via the optical transmission path on the input side passes through the optical isolator 21a and is incident on the rare earth-doped optical fiber 11. If excitation light from the laser light source 13 is supplied to the rare earth-doped optical fiber 11, the signal light is amplified and output to the splitter 15. If excitation light from the laser light source 13 is not being supplied, the signal light passes through the rare earth-doped optical fiber 11 which is not in the excited state. At this time, the signal light is attenuated by the rare earth-doped optical fiber 11 instead of being amplified.

Figure 3:
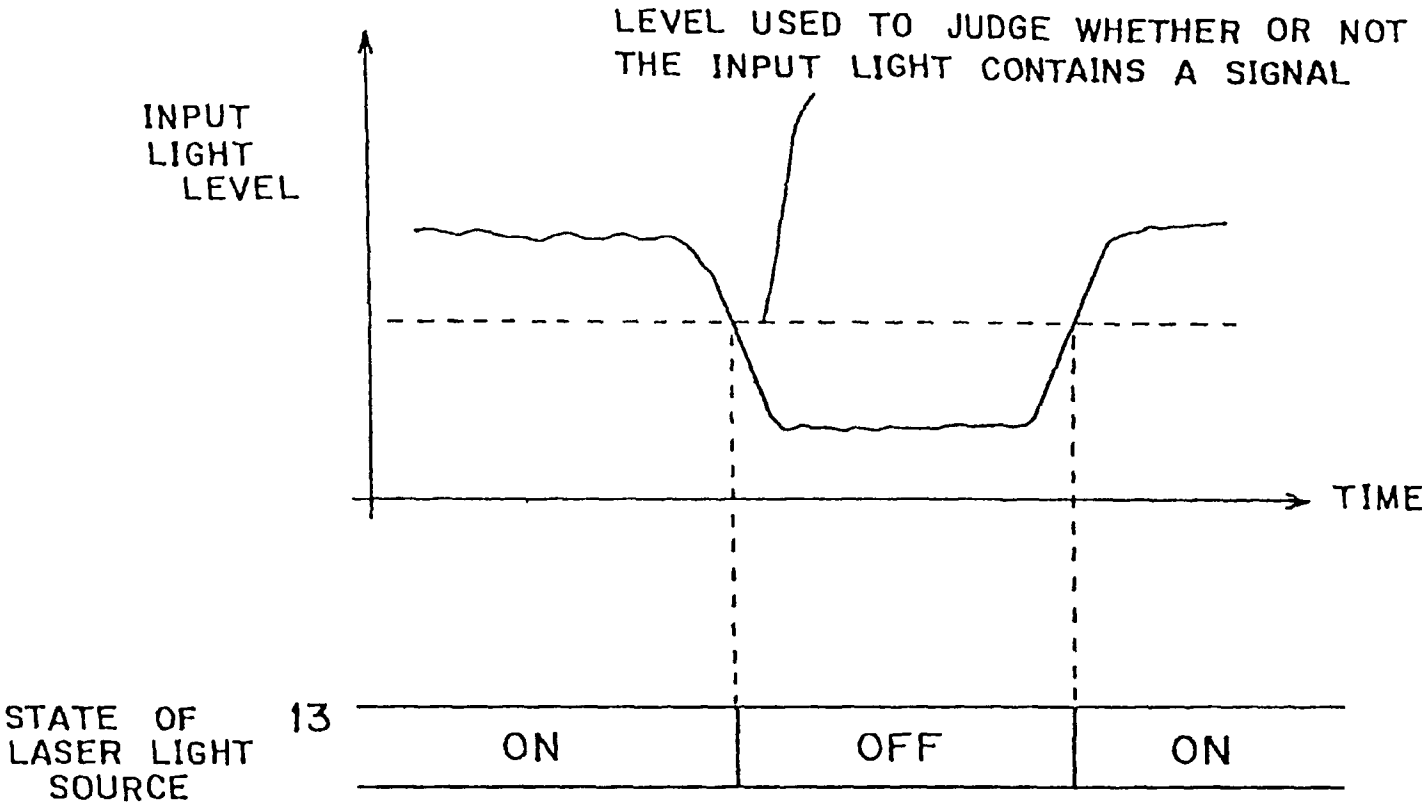
FIG. 3 is a graph showing the states of the input light level and the laser light source.

Whether or not excitation light is supplied from the laser light source 13 to the rare earth-doped optical fiber 11 is determined according to the input light level as described above. That is to say, if the input light level detected by the photodiode 16 is higher than the preset threshold level, it is judged that the input light contains a signal including transmitted information, and the control circuit 19 causes the laser light source 13 to output excitation light in order to amplify that input light. On the other hand, if the input light level is lower than the threshold level, it is judged that the input light does not contain a signal to be transmitted. If the input light does not contain a signal, it is not necessary to amplify the input light, so the control circuit 19 stops driving the laser light source 13. The states of the input light level and the laser light source 13 are shown in FIG. 3.

As described above, the optical amplifier of this embodiment has the rare earth-doped optical fiber 11 in front of the circuit that monitors the input light level (the splitter 15 and the photodiode 16); when the input light contains a signal, the input light level amplified by the rare earth-doped optical fiber 11 is monitored.

Next, how the rare earth-doped optical fiber 11 is designed will be explained. That is to say, the ranges within which the gain when excitation light is supplied to the rare earth-doped optical fiber 11, and the loss when excitation light is not supplied, are set, will be explained.

The gain of the rare earth-doped optical fiber 11 is set to be larger than the loss that occurs when the input light level is monitored. The loss that occurs when the input light level is monitored comes about because the input light is branched (for example, in the ratio 10:1) using the splitter 15. That is to say, the amount of light that is amplified by the rare earth-doped optical fiber 12 is 10/11 of the amount that there would be if the splitter 15 were not used, on account of the branching of light by the splitter 15, so that a loss of about 0.4 dB occurs. Consequently, in this case, the rare earth-doped optical fiber 11 must have a gain of at least 0.4 dB, so that when the signal light passes through the rare earth-doped optical fiber 11 that light amount will be amplified by a factor of at least 11/10.

Figure 4A:
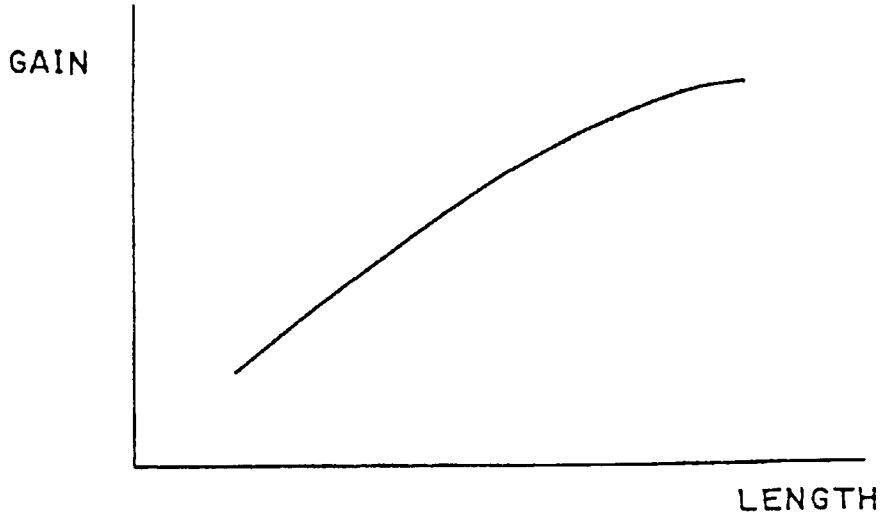
FIG. 4A is a graph showing the dependence on length of the gain of the rare earth-doped optical fiber.
Figure 4B:
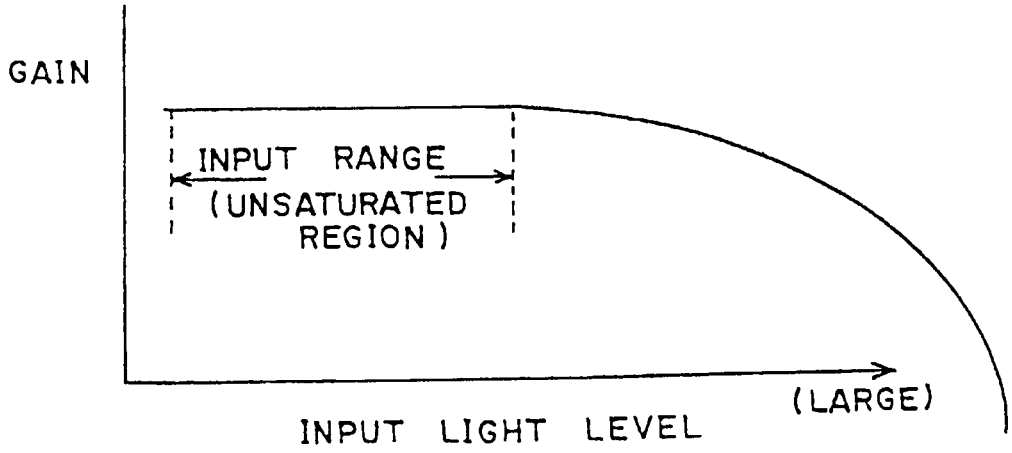
FIG. 4B is a graph showing the dependence on input light level of the gain of the rare earth-doped optical fiber.

In general, the gain of a rare earth-doped optical fiber depends on its length, if we assume that the concentration of the erbium that is doped into it is fixed. FIG. 4A shows the relation between the length of the rare earth-doped optical fiber and its gain. As shown in FIG. 4A, the longer the rare earth-doped optical fiber, the larger the gain. In addition, as shown in FIG. 4B, the gain per unit length of a rare earth-doped optical fiber is almost constant regardless of changes in the input light level, as long as the input light level does not become too high. Consequently, if the wavelength of the input light to be amplified, the wavelength of the excitation light, and the excitation light power are known, the gain can be determined by adjusting the length of the rare earth-doped optical fiber.

For example, if branching-off a part of the input light by the splitter 15 reduces the light level input to the rare earth-doped optical fiber 12 by 0.4 dB, the length of the rare earth-doped optical fiber 11 is adjusted so that the gain of the rare earth-doped optical fiber 11 when the excitation light is supplied is larger than 0.4 dB.

Meanwhile, when excitation light is not supplied, the rare earth-doped optical fiber 11 does not amplify the input light, but rather attenuates the input light. That is to say, a loss occurs. In general, the loss in a rare earth-doped optical fiber to which excitation light is not supplied is greater than the loss in an ordinary optical fiber, and the longer the rare earth-doped optical fiber, the greater the loss. Consequently, if the rare earth-doped optical fiber 11 is made too long in order to make the gain greater than a specified value when excitation light is supplied, then when excitation light is not supplied, the loss in the rare earth-doped optical fiber 11 will become large. That is to say, if the rare earth-doped optical fiber 11 is made longer than necessary, then the input light may not be able to pass through when excitation light is not supplied.

Figure 5:
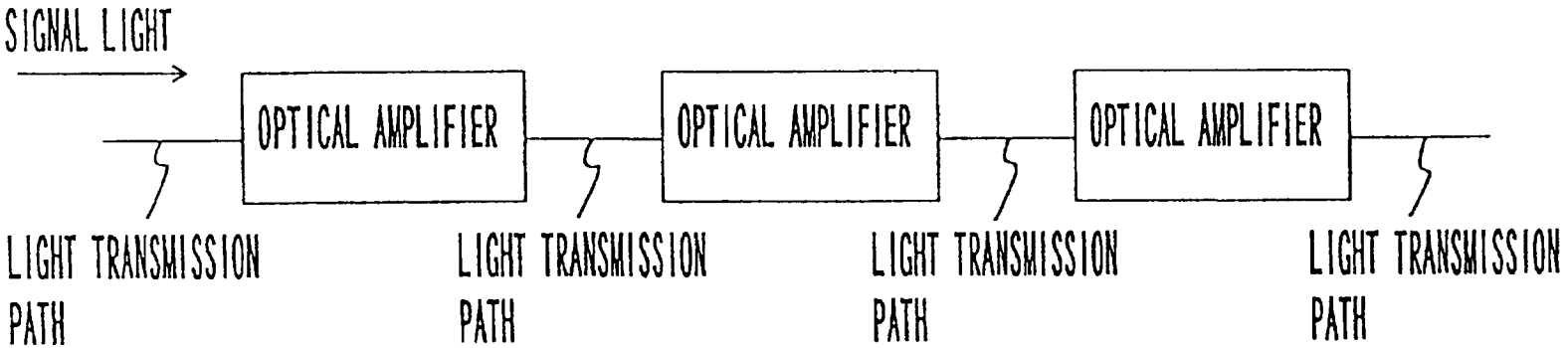
FIG. 5 is a block diagram showing one example of a system configuration in which the optical amplifier of this configuration is used.

Here, in order to explain to what extent the loss in the rare earth-doped optical fiber 11 when excitation light is not supplied should be suppressed, we assume the configuration of an optical transmission system as shown in FIG. 5. In the system shown in FIG. 5, an optical amplifier shown in FIG. 2 is installed at each of the relay nodes; the minimum light level that must be received by each optical amplifier is predetermined to be, for example, −35 dBm. In other words, in this system, when a signal is being transmitted, if the input light level to each optical amplifier is −35 dBm or greater, it can be guaranteed that the light will be transmitted to the next relay node. We also assume that the photodiode 16 can convert the light level accurately into an electrical signal if the light level is, for example, −50 dBm or greater.

In the system described above, even if each optical amplifier receives light in the order of −35 dBm or greater, it would be possible to accurately monitor the input light level. Since the splitter 15 branches off part of the input light in the ratio 10:1 and the photodiode 16 receives 1/11 of the input light, the light level received by the photodiode 16 is in the order of 10 dB less than the light level output from the rare earth-doped optical fiber 11. Consequently, for example, if we assume that the total loss in the connector 20a and the optical isolator 21a is 1 dB, and if the design must provide a margin of 3 dB, the loss in the rare earth-doped optical fiber 11 when excitation light is not supplied must be kept to 1 dB (−35−(−50)−10−1−3=1) or less. In other words, if the loss in the rare earth-doped optical fiber 11 when excitation light is not supplied is defined in this manner, then, even when excitation light is not being supplied, the input light level when a signal is transmitted can be reliably monitored. In general, as described above, the loss in a rare earth-doped optical fiber when excitation light is not supplied is proportional to its length. Consequently, in order to set the loss to be at or below a certain level, it is sufficient to keep the length of the rare earth-doped optical fiber to be at or less than a certain length.

The important points in designing the rare earth-doped optical fiber 11 are given below.

(1) The gain of the rare earth-doped optical fiber 11 when excitation light is being supplied must be greater than the loss that occurs when the input light level is monitored.

(2) The loss in the rare earth-doped optical fiber 11 when excitation light is not being supplied must be smaller than the difference between the minimum light level predetermined in the system in which the optical amplifier is installed and the smallest light level that can be detected by the photodiode 16.

If the length of the rare earth-doped optical amplifier 11 is adjusted so that it satisfies the above two conditions, a minimum limit on the length of the rare earth-doped optical amplifier 11 is given by (1) above and a maximum limit is given by (2) above.

In the above configuration, signal light that arrives after being transmitted via an optical transmission path is amplified by the rare earth-doped optical fiber 11, then is guided to a device (the splitter 15 and the photodiode 16)) that monitors the input light level. At this time, since the gain of the rare earth-doped optical fiber 11 is greater than the loss that occurs in the input light level monitoring device, the S/N (signal-to-noise ratio) of the input signal is not decreased by providing a device to monitor the input light level. Consequently, the noise index of the optical amplifier does not become worse.

If the level of the signal light input to the rare earth-doped optical fiber 11 is limited to the input range shown in FIG. 4B (the unsaturated region, or the small signal input region), since the gain does not vary with input light level within that range, the light output level of the rare earth-doped optical fiber 11 is proportional to the level of light input level to the optical amplifier. In this case, the input light level to the optical amplifier can be computed easily based on the output of the rare earth-doped optical fiber 11. In fact, since optical amplifiers are often installed where they will receive signal light that has been transmitted over a long transmission path, the input light level to the optical amplifier is normally within the unsaturated region shown in FIG. 4B.

An optical amplifier with the configuration described above has two rare earth-doped optical fibers, but the excitation light output from a single light source (the laser light source 13) is supplied to both of those rare earth-doped optical fibers, so the power consumption for providing excitation light does not become very large.

Figure 6:
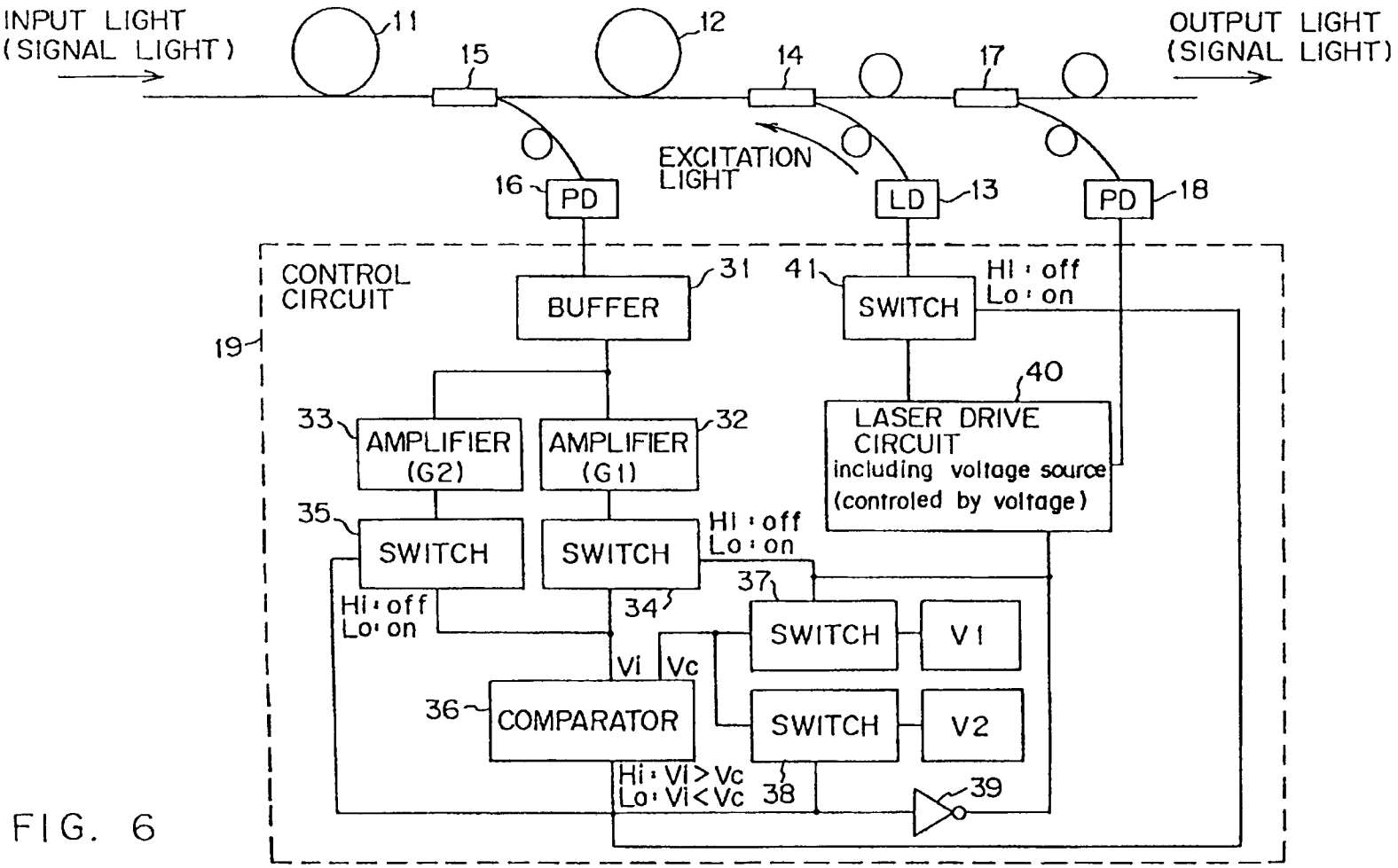
FIG. 6 is a detailed block diagram of the control circuit.

FIG. 6 is a detailed block diagram of the control circuit 19. As described above, the output light from the rare earth-doped optical fiber 11 is branched by the splitter 15, and the branched-off light is converted into an electrical signal by the photodiode 16. Consequently, this electrical signal provides data that indicate the light level of the input light to the optical amplifier. The control circuit 19 writes data indicating the input light level received from the photodiode 16 into the buffer 31. The buffer 31 can be, for example, a voltage follower. The output from the buffer 31 is supplied to the amplifiers 32 and 33. The amplifiers 32 and 33 have gain G1 and gain G2, respectively. Here we assume G1<G2. The outputs from the amplifiers 32 and 33 are transferred to the Vi terminal of the comparator 36 via the switches 34 and 35, respectively. The switches 34 and 35 are, for example, constructed using FETs. When the switch control signal that they receive is "L", they switch ON; when "H" is received they switch OFF. These switch control signals are formed based on the result of a comparison by the comparator 36.

The reference voltage V1 or V2 is input to the Vc terminal of the comparator 36, according to the states of the switches 37 and 38. The manner in which V1 and V2 are determined will be described below. In addition, the switches 37 and 38, like the switches 34 and 35, come ON when the switch control signal "L", is received, OFF when "H" is received.

The comparator 36 compares the voltage applied to the Vi terminal with the voltage applied to the Vc terminal; if the voltage applied to the Vi terminal is higher, "H" is output, while if the voltage applied to the Vc terminal is higher, "L" is output. The voltage applied to the Vc terminal of the comparator 36, that is to say the reference voltage V1 or V2, is the threshold level to which the input light level is compared. The comparator 36 outputs "H" if the input light level is higher than the threshold level, "L" if it is lower. The output of the comparator 36 is transferred to the switches 35 and 38, and, at the same time, is inverted by the inverter. 39 and then transferred to the switches 34 and 37. These signals are the switch control signals.

The output light from the rare earth-doped optical fiber 12 is branched by the splitter 17 and the branched-off light is converted into an electrical signal by the photodiode 18. This output signal provides data indicating the light level of the output light from the optical amplifier. The data indicating this output light level are input to the laser drive circuit 40. The laser drive circuit 40 contains a power supply, and determines the output voltage in accordance with the data indicating the output light level received from the photodiode 18. In the present embodiment, the laser drive circuit 40 controls its output voltage so that the output from the photodiode 18 will be held constant, so that output light level of the optical amplifier is held constant. When the output from the comparator 36 becomes "L", the action of the laser drive circuit 40 stops. That is to say, if the input light level is below the threshold level, the laser drive circuit 40 does not operate.

The output from the laser drive circuit 40 is fed to the laser light source 13 via the switch 41. The switch 41 is controlled by the output of the comparator 36. When "L" is received it switches ON; when "H" is received it switches OFF. When the switch 41 is ON, the laser light source 13 outputs excitation light of a power corresponding to the output voltage from the laser drive circuit 40. When the switch 41 is OFF, the laser light source 13 is not driven, and excitation light is not generated. That is to say, if the input light level is higher than the threshold level, the laser light source 13 is driven corresponding to the output voltage from the laser drive circuit 40, while if the input light level is lower than the threshold level, the laser light source 13 is not driven.

Now the changes of state of an optical amplifier with the configuration described above, will be explained by referring to FIG. 7 and FIG. 8. The optical amplifier of this embodiment switches between the normal state and the shutdown state. The normal state is the state in which excitation light is input into the rare earth-doped optical fibers 11 and 12, and occurs when the input light level is higher than the threshold level. Meanwhile, the shutdown state is the state in which excitation light is not input to the rare earth-doped optical fibers 11 and 12, and occurs when the input light level is lower than the threshold level.

Figure 7:
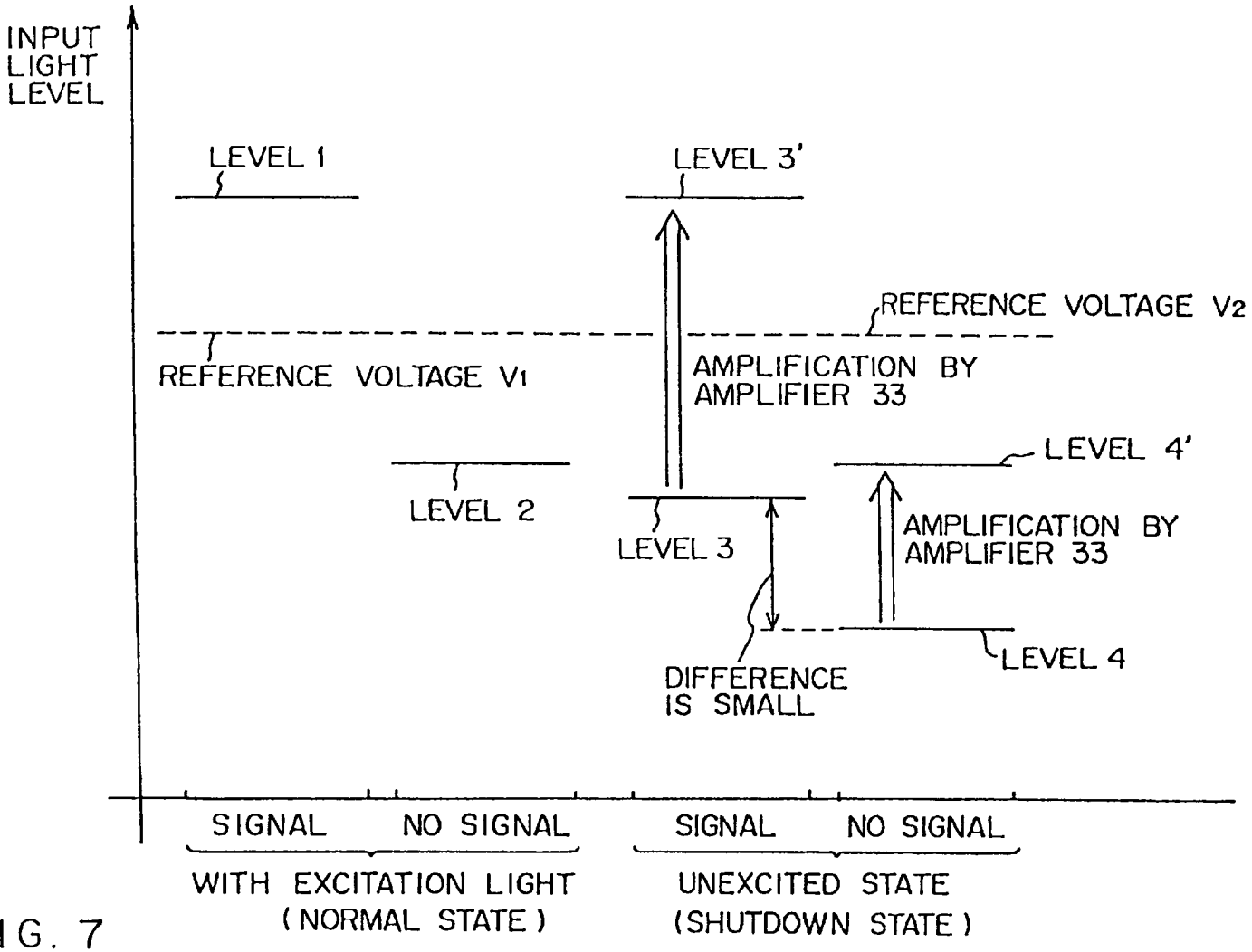
FIG. 7 is a diagram explaining the control circuit action.
Figure 8:
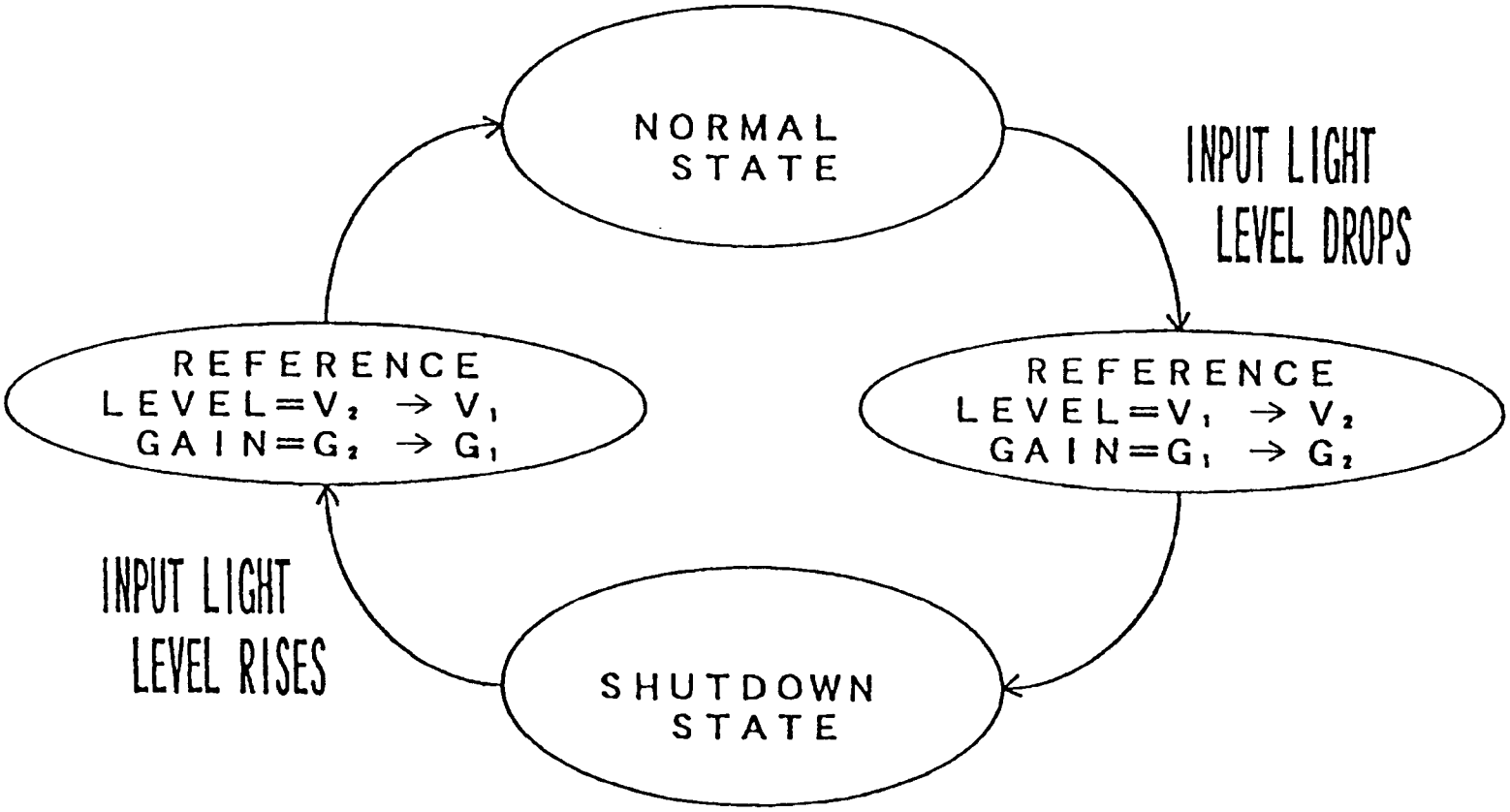
FIG. 8 is a diagram explaining changes of the state of the optical amplifier.

Let us consider the case in which the input light contains a signal, with the optical amplifier in its normal state. The input light level at this time is, for example, level 1. In FIG. 7, the input light level appears as the input voltage to the comparator 36. Also, to simplify the explanation, the gain G1 of the amplifier 32 is assumed to be "1".

Level 1 is larger than the reference voltage V1, and the output of the comparator 36 becomes "H". For this reason, the output of the amplifier 32 is applied to the Vi terminal of the comparator 36, while the reference voltage V1 is applied to the Vc terminal. Also, the laser light source 13 outputs excitation light.

In the normal state described above, for example, if the input light ceases to contain a signal, the input light level drops to level 2. At this time, the output voltage of the photodiode 16 drops. When the input light level thus becomes smaller than the reference voltage V1, the output of the comparator 36 changes from "H" to "L", the switches 35 and 38 switch ON, and, at the same time, the switches 34 and 37 switch OFF. In this state, the output voltage from buffer 31 is applied to the Vi terminal of the comparator 36 after being amplified by the amplifier 33 (gain G2), and compared to the reference voltage V2. In addition, when the output of the comparator 36 becomes "L", the switch 41 switches OFF, as a consequence of which the laser light source 13 no longer outputs excitation light, and the optical amplifier goes into the shutdown state (the non-excited state).

In the shutdown state, the rare earth-doped optical fibers 11 and 12 are in the non-excited state, so that when input light passes through the rare earth-doped optical fiber 11, that input light is not amplified; on the contrary, it is attenuated. Consequently, the input light level that is obtained as the output of the photodiode 16 (the output light level of the rare earth-doped optical fiber 11) is smaller than in the normal state. In FIG. 7, when input light that does not contain a signal passes through the rare earth-doped optical fiber 11 to which excitation light is not being supplied, the level, assuming that the output light from the rare earth-doped optical fiber 11 is amplified at the same gain as in the normal state (gain G1 by the amplifier 32) is expressed as level 4. Level 3 is the level obtained assuming that, when input light that contains a signal passes through the rare earth-doped optical fiber 11 to which excitation light is not being supplied, the output light is amplified at the same gain as in the normal state (gain G1 by the amplifier 32).

In the assumed configuration described above, when the input light contains a signal level 3 is detected, while when the input light does not contain a signal level 4 is detected. Here, in order to discriminate level 3 from level 4 using the comparator 36, it is sufficient to set a threshold level that is intermediate between those two levels, and then judge based on whether the measured level is higher or lower than the threshold level. However, in the configuration assumed above, as shown in FIG. 7, the difference between level 3 and level 4 is small, so that there is danger that the above judgment will be erroneous.

In order to solve this problem, in the optical amplifier of this embodiment, when the optical amplifier switches from the normal state to the shutdown state, the amplifier that amplifies the output of the photodiode 16 is switched from amplifier 32 to amplifier 33, so that the output of the photodiode 16 is amplified at a gain G2 that is larger than the gain G1 which is used when the optical amplifier is in the normal state. As a result, as shown in FIG. 7, level 3 and level 4 are amplified to level 3' and level 4', respectively. If the output of the photodiode 16 is thus amplified, the difference between level 3' and level 4' is large, and it is easy to set the threshold level (the reference voltage V2). As shown in FIG. 7, the reference voltage V2 can, for example, be set to the same order as the reference voltage V1.

Thus, in the optical amplifier of this embodiment, by increasing the gain of the amplifier in the shutdown state, the sensitivity of the photodiode 16 is essentially increased, so that even if the light level is in the order of level 3 it can be detected as light in the order of level 3'.

If the input light comes to contain a signal while the optical amplifier is in the shutdown state, the input light level increases from level 4' to level 3'. In other words, when the input light level rises above a threshold level, the control circuit 19 judges that the signal light that is input includes a signal to be transmitted. In this case, the voltage applied to the Vi terminal becomes larger than the reference voltage applied to Vc, and the output of the comparator 36 becomes "H". As a result, the output voltage from the buffer 31 is applied to the Vi terminal of the comparator 36 after being amplified by the amplifier 32 (gain G1), and that amplified voltage is compared to the reference voltage V1. In addition, when the output of the comparator 36 becomes "H", the switch 41 switches ON, the laser light source 13 is driven by the laser drive circuit 40, and the laser light source 13 outputs excitation light. Then the rare earth-doped optical fibers 11 and 12 go into the excited state, and the light that passes through them becomes amplified.

Figure 9:
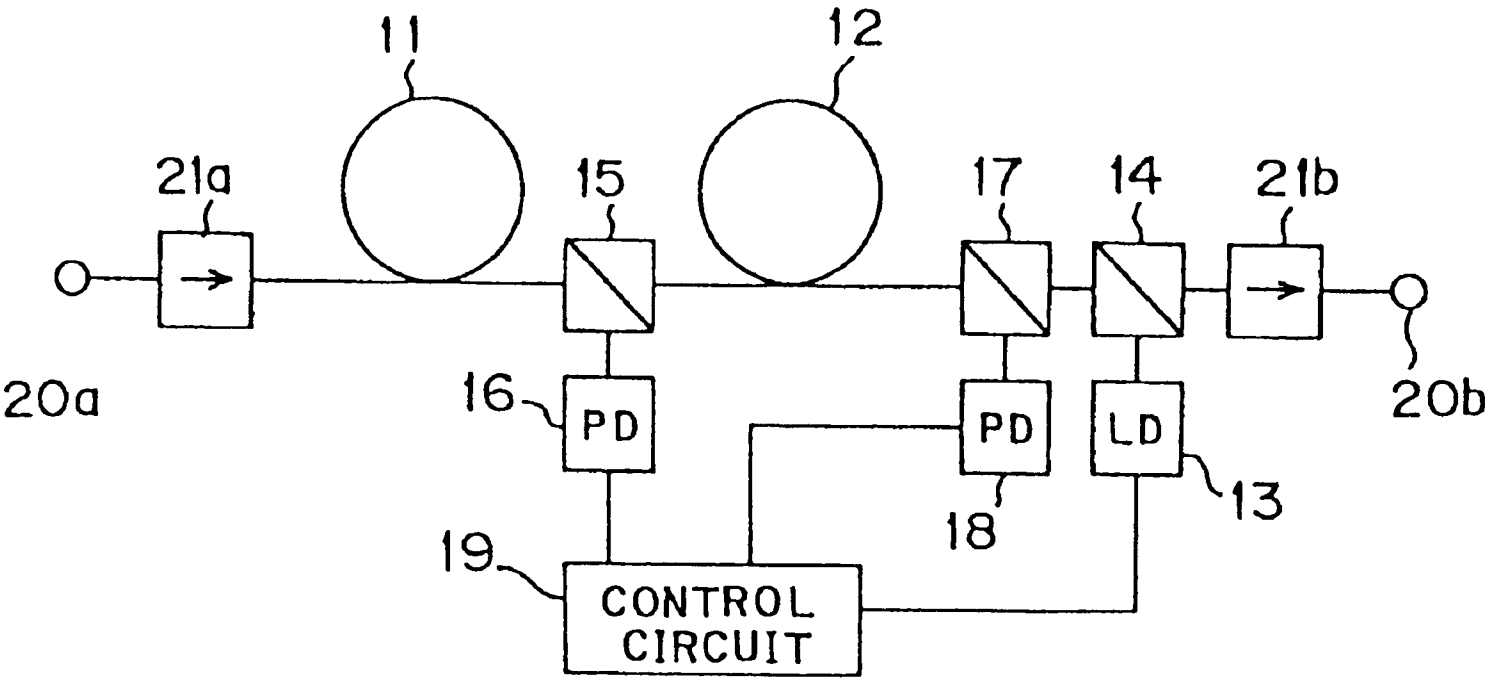
FIG. 9 is a schematic diagram showing a configuration of an example of a modification of the optical amplifier of this embodiment (No. 1).
Figure 10:
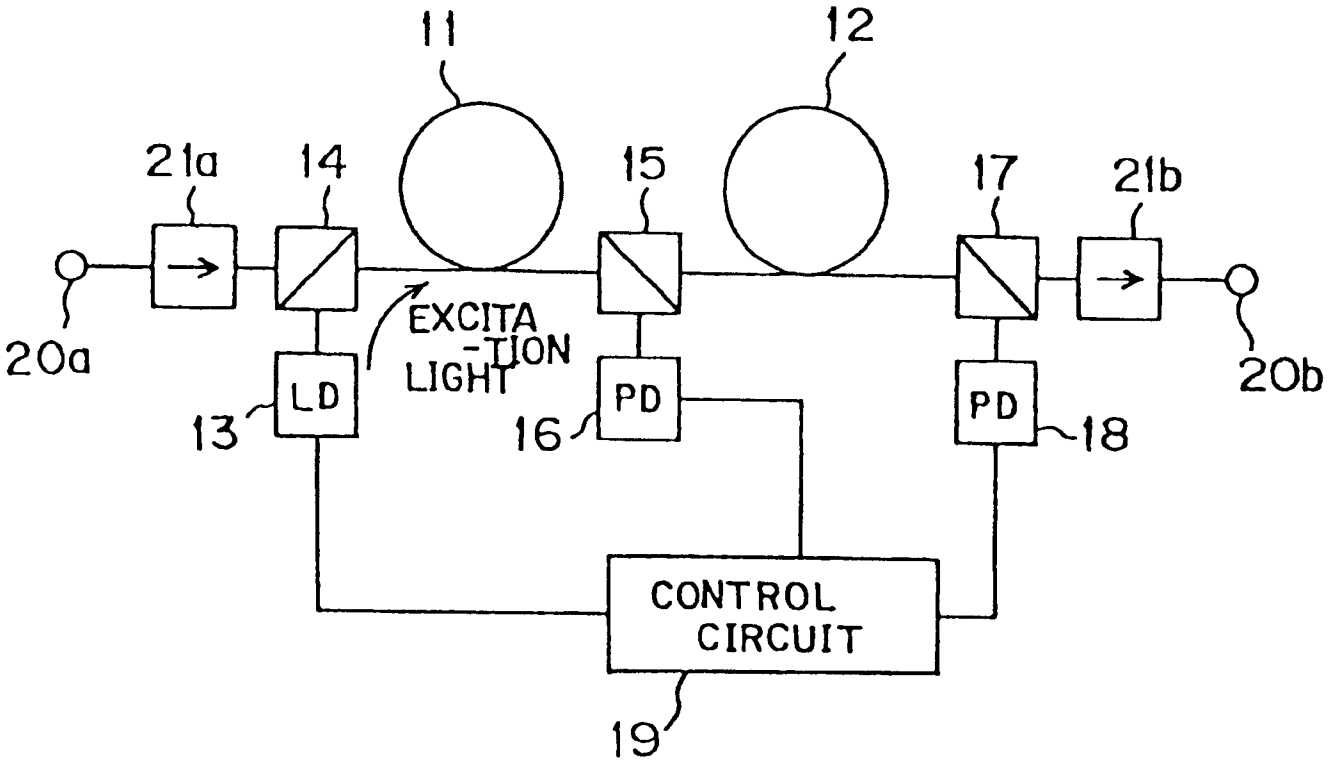
FIG. 10 is a schematic diagram showing a configuration of an example of a modification of the optical amplifier of this embodiment (No. 2).

FIG. 9 and FIG. 10 are diagrams showing variations of the configuration of the optical amplifier of this embodiment. In FIG. 9 and FIG. 10, the same numbered symbols have the same functions as described with reference to FIG. 2. In FIG. 9 and FIG. 10, the symbols showing where optical fibers are fused together are omitted.

When the optical amplifier shown in FIG. 9 is compared with the configuration shown in FIG. 2, the positions of the device that supplies excitation light (the laser light source 13 and the optical coupler 14) and the device that monitors the output light (the splitter 17 and the photodiode 18) have been interchanged.

In the configuration shown in FIG. 10, the device that supplies excitation light (the laser light source 13 and the optical coupler 14) is located on the input side of the rare earth-doped optical fiber 11. That is to say, the optical amplifiers shown in FIG. 2 and FIG. 9 are configured so that excitation light is supplied from the output sides of the rare earth-doped optical fibers 11 and 12 (backward excitation), but the optical amplifier shown in FIG. 10 is configured so that excitation light is supplied from the input sides of the rare earth-doped optical fibers 11 and 12 (forward excitation).

Figure 11:
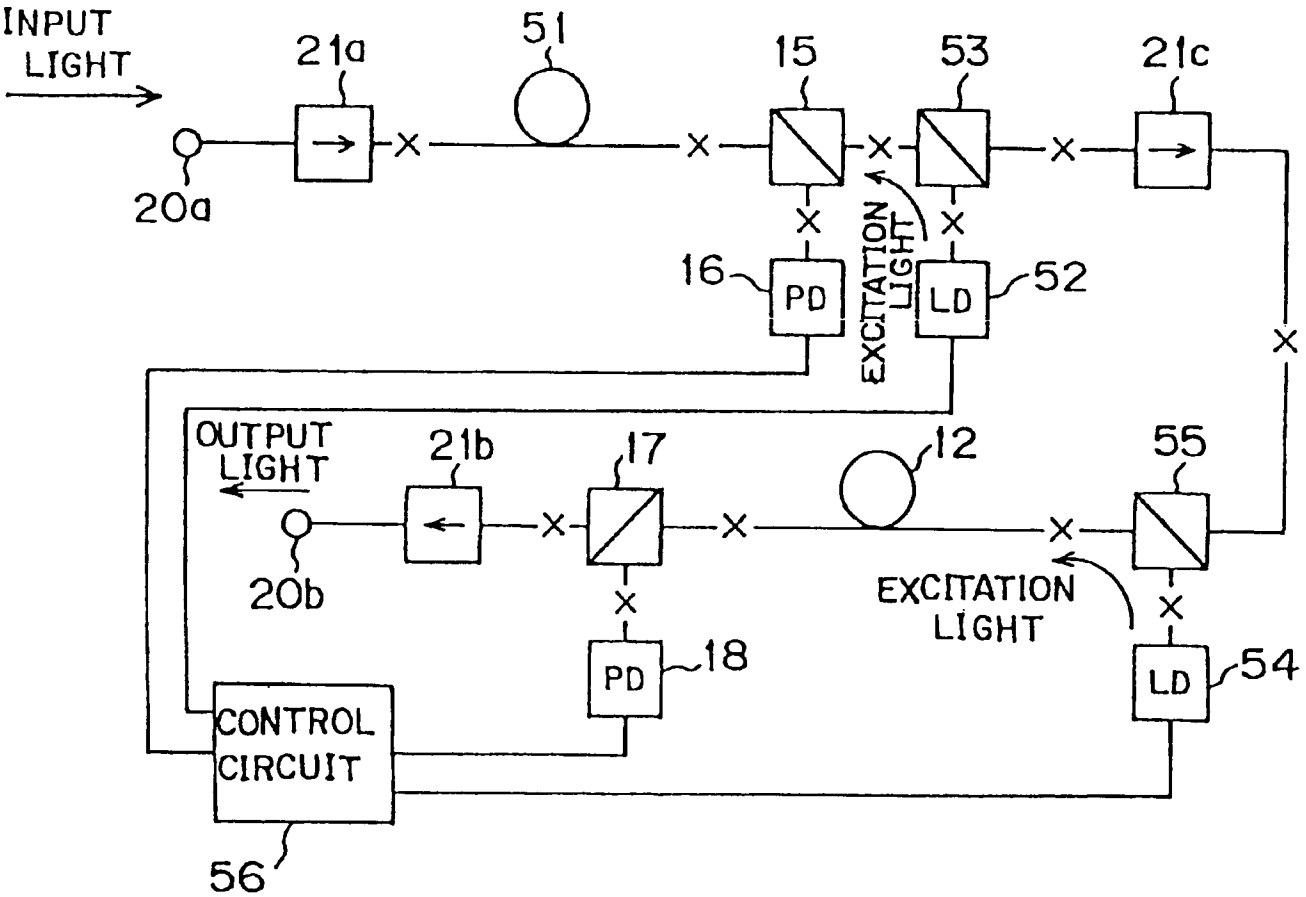
FIG. 11 is a schematic diagram showing a configuration of an example of a modification of the optical amplifier of this embodiment (No. 3).

FIG. 11 is a diagram showing another variation of the configuration of the optical amplifier of this embodiment. In FIG. 11, the same numbered symbols have the same functions as described with reference to FIG. 2. In the optical amplifier shown in FIG. 11 the laser light source 52 supplies excitation light to the optical fiber 51 via the optical coupler 53, and the laser light source 54 supplies excitation light to the rare earth-doped optical fiber 12 via the optical coupler 55. The optical fiber 51 may be the same as the rare earth-doped optical fiber 11. The control circuit 56 performs basically the same control as the control circuit 19 shown in FIG. 2. That is to say, the control circuit 56 determines the input light level from the electrical signal output by the photodiode 16, and the output light level from the electrical signal output by the photodiode 18. When the input light level becomes lower than the threshold level referred to above, the control circuit 56 applies control so that light is not output from the laser light sources 52 and 54. The control circuit 56 holds the output light level fixed, for example by means of an ALC (Automatic Level Control) function. The optical amplifier shown in FIG. 11 has an optical isolator 21c between the optical fiber 51 and the rare earth-doped optical fiber 12.

When the input light does not contain a signal, it is sufficient to stop light emission from only the laser light source 54 while the laser light source 52 continues to emit light. In this kind of configuration, the power consumption is greater than in a configuration in which both of the laser light sources 52 and 54 stop emitting light, but this is advantageous from the point of view of monitoring sensitivity because light that is input into the optical fiber 51 during the shutdown state is not attenuated.

Figure 12:
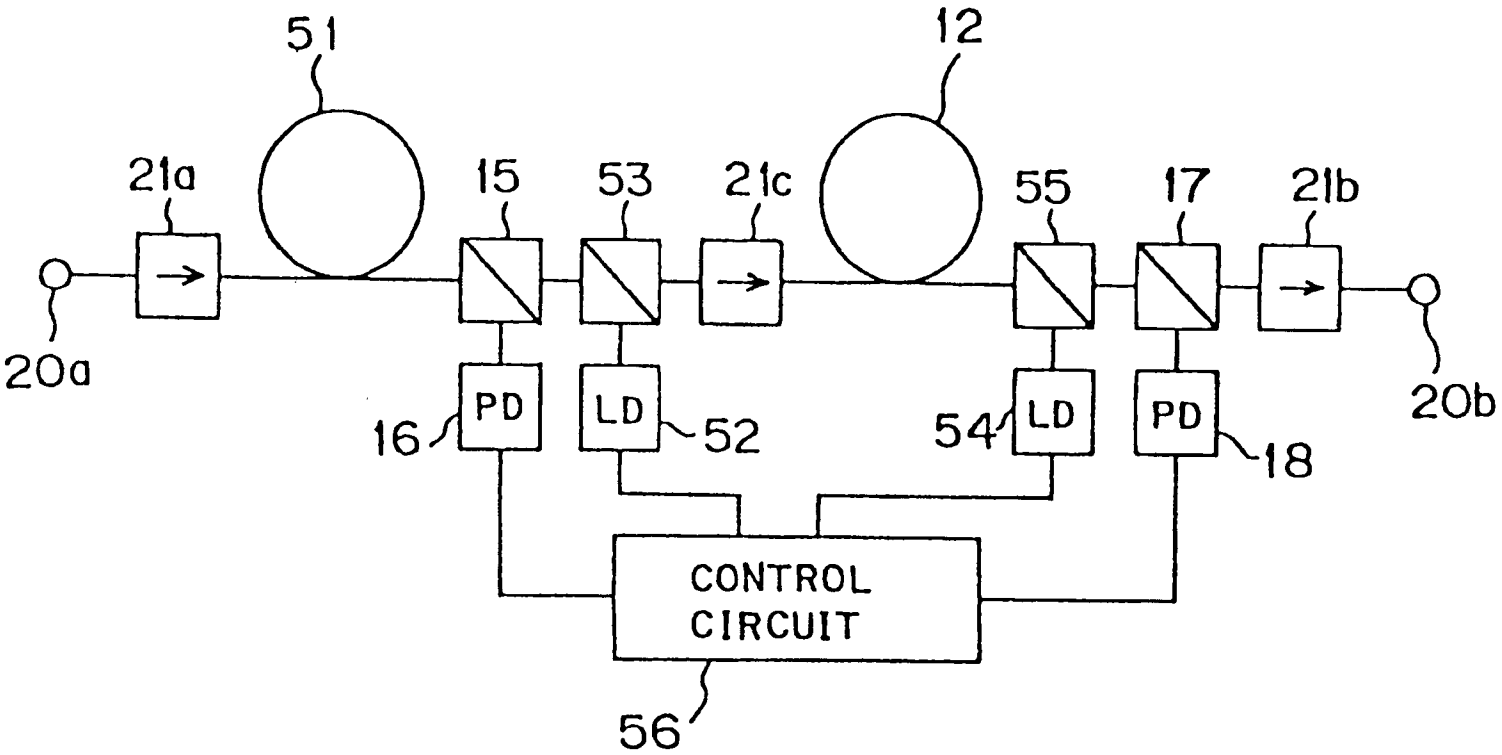
FIG. 12 is a schematic diagram showing a configuration of an example of a modification of the optical amplifier of this embodiment (No. 4).

FIG. 12 is a diagram showing a variation of the configuration of the optical amplifier shown in FIG. 11. The optical amplifier shown in FIG. 12 has a backward excitation configuration in which excitation light is supplied from the output side of the rare earth-doped optical fiber 12.

Figure 13:
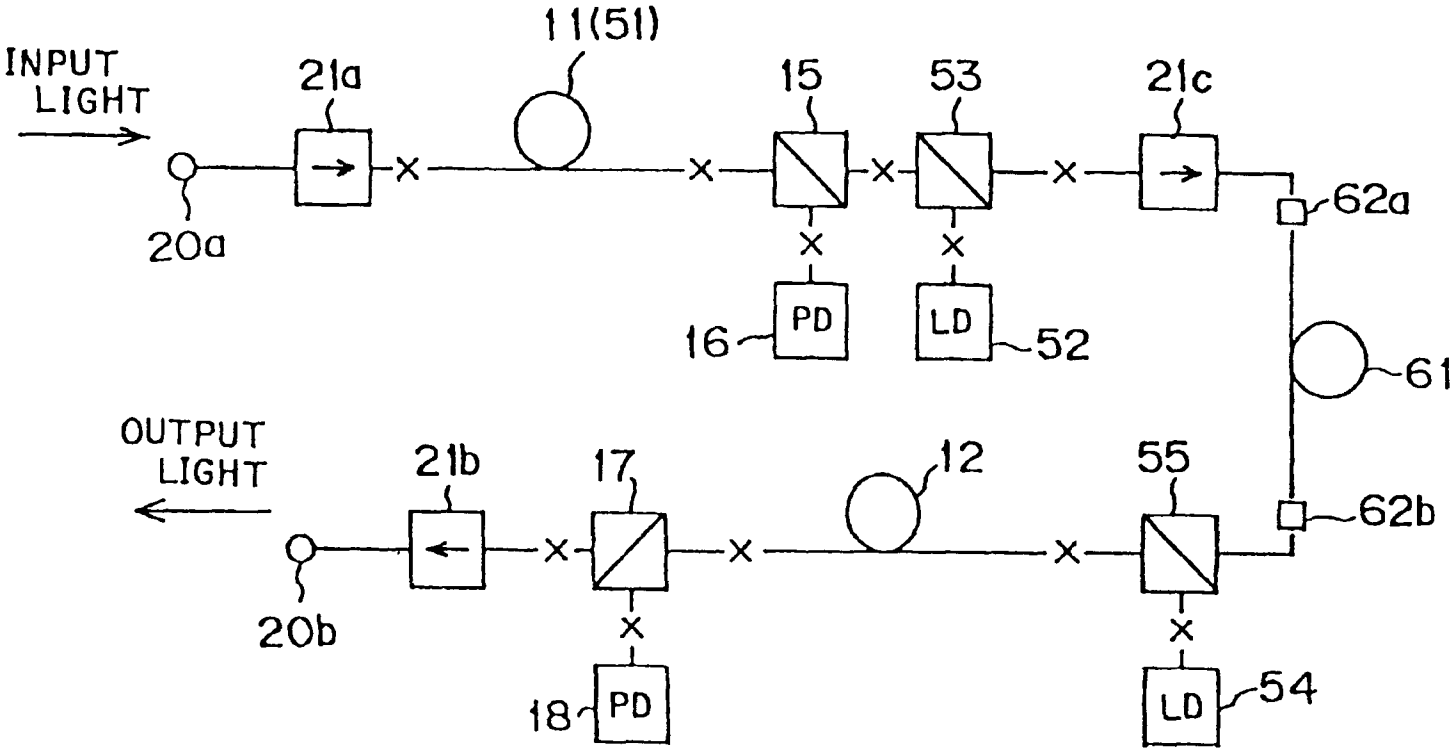
FIG. 13 is a schematic diagram showing a configuration of an example of a modification of the optical amplifier of this embodiment (No. 5).

FIG. 13 is a diagram of still another variation of the configuration of the optical amplifier of this embodiment. The optical amplifier shown in FIG. 13 has a dispersion compensation optical fiber 61 between the rare earth-doped optical fiber 11 and the rare earth-doped optical fiber 12 shown in FIG. 2 (between the optical fiber 51 and the rare earth-doped optical fiber 12 shown in FIG. 11). In FIG. 13, the control circuit is omitted.

The dispersion compensation optical fiber 61 is installed on the transmission path inside the optical amplifier by means of the connectors 62a and 62b. In this kind of configuration, a number of optical fibers having different dispersion compensation values are provided, and an appropriate dispersion compensation optical fiber can be selected and connected according to the transmission path on the input side of the optical amplifier. The dispersion compensation optical fiber 61 produces a nonlinear effect depending on the light input level. Consequently, the light input level to the dispersion compensation optical fiber 61 can be adjusted to have an optimum value, for example, by controlling the light power emitted from the laser light source 52.

Figure 14:
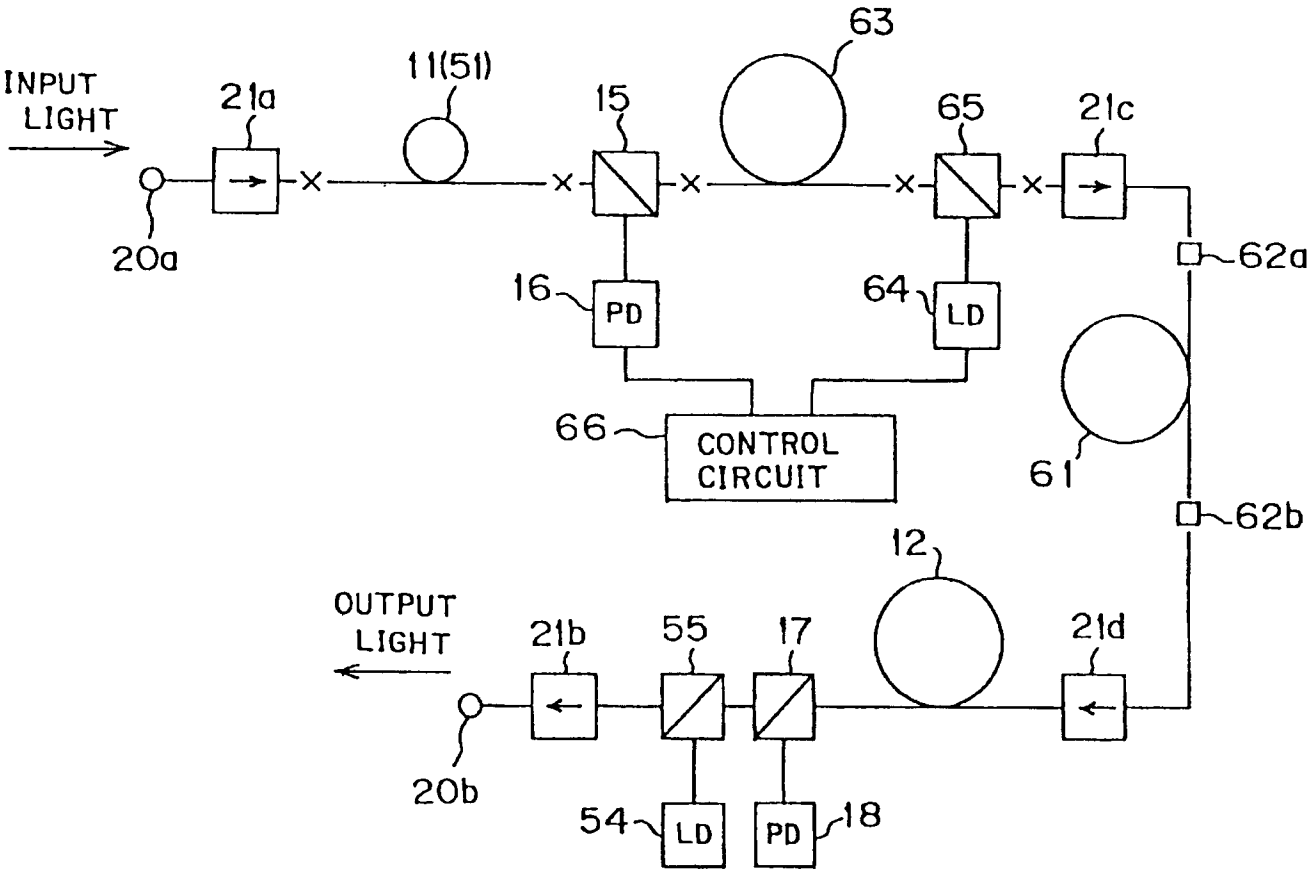
FIG. 14 is a schematic diagram showing a configuration of an example of a modification of the optical amplifier of this embodiment (No. 6).

FIG. 14 is a diagram of a variation of the configuration of the optical amplifier shown in FIG. 13. The optical amplifier shown in FIG. 14 has a configuration in which, in the optical amplifier shown in FIG. 13, another rare earth-doped optical fiber 63 is installed between the rare earth-doped optical fiber 11 and the dispersion compensation optical fiber 61. The control circuit 66 drives the laser light source 64 so that the input level to the dispersion compensation optical fiber 61 is the optimum level for dispersion compensation, thus applying control so that the output light level from the rare earth-doped optical fiber 63 is held fixed. The output from the laser light source 64 is guided by the optical coupler 65 and supplied as excitation light to the rare earth-doped optical fibers 63 and 11.

Figure 15:
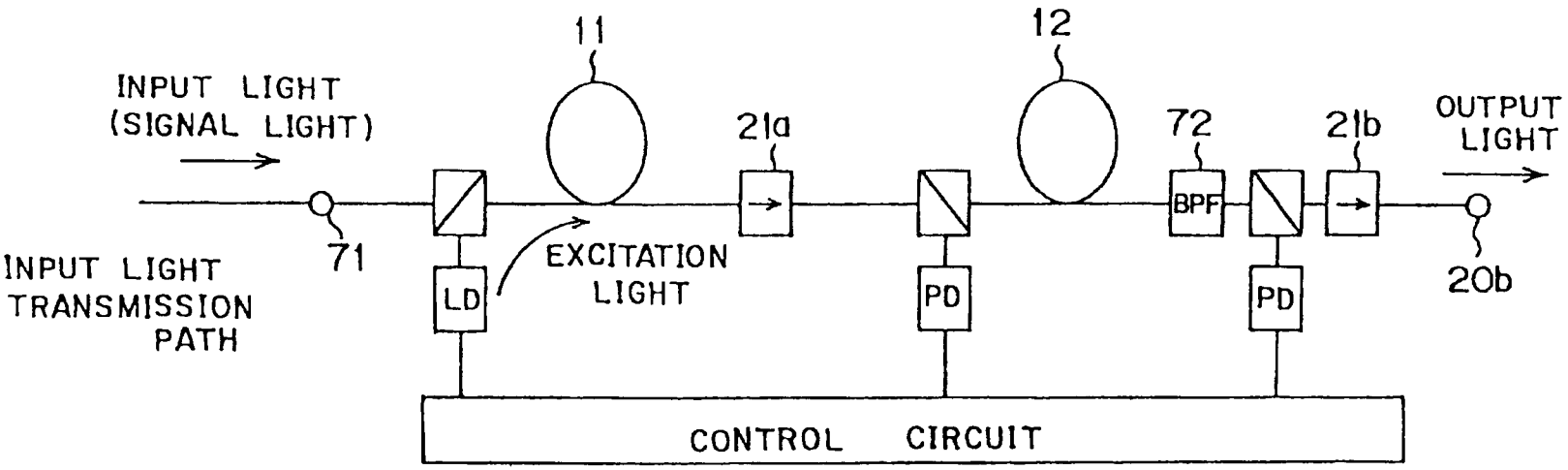
FIG. 15 is a schematic diagram showing a configuration of an example of a modification of the optical amplifier of this embodiment (No. 7).
Figure 16:
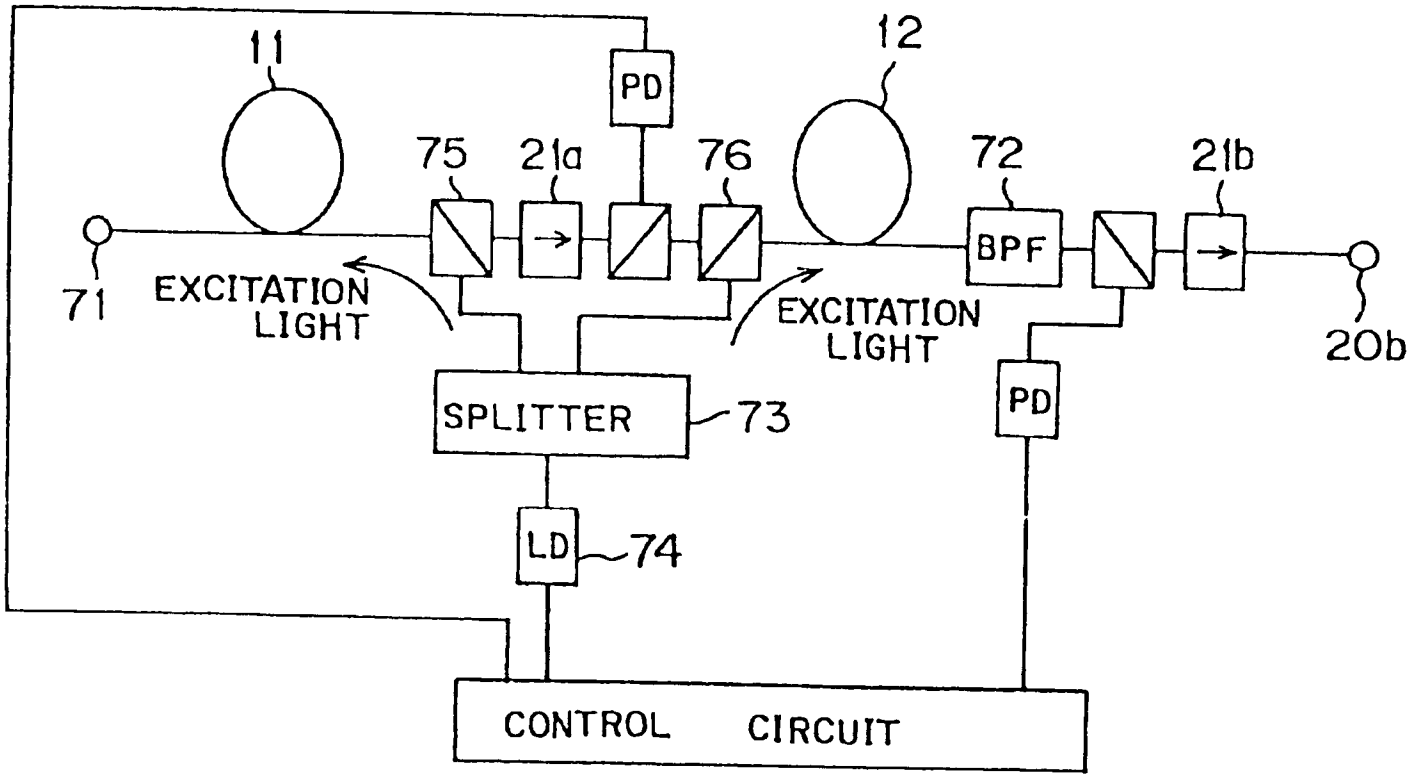
FIG. 16 is a schematic diagram showing a configuration of an example of a modification of the optical amplifier of this embodiment (No. 8).
Figure 17:
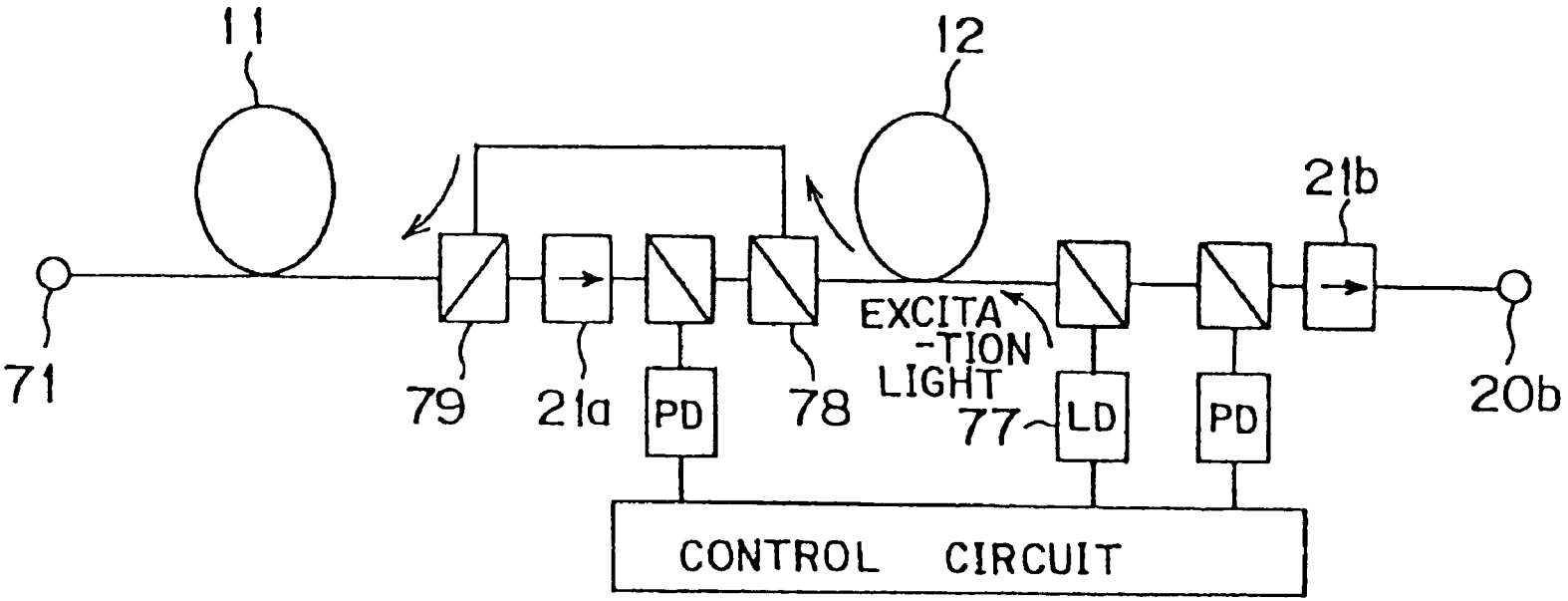
FIG. 17 is a schematic diagram showing a configuration of an example of a modification of the optical amplifier of this embodiment (No. 9).

FIGS. 15 to 17 are diagrams of still further variations of the configuration of the optical amplifier of this embodiment. These optical amplifiers are configured so that the optical isolator on the input side of the rare earth-doped optical fiber 11 (for example, the optical isolator 21a in FIG. 2) can be eliminated by using connectors having low reflection as the input side connectors. Note that this optical isolator 21a is installed between the rare earth-doped optical fiber 11 and the rare earth-doped optical fiber 12.

In FIGS. 15 to 17, the connector 71 is a low-reflection connector that connects the input side optical transmission path to the optical amplifier. The amount of reflection in the connector generally depends on the cross-sectional shapes of the ends of the optical fibers contained in that connector. It is known that, for example, that a spherical polished shape and a diagonal polished convex spherical shape are cross-sections which produce low reflection.

Thus, in a configuration in which the optical isolator is removed from the input side of the rare earth-doped optical fiber 11, considering the possibility that the optical isolator itself is a cause of loss, the input light level to the rare earth-doped optical fiber 11 is increased. For example, if we assume that the loss in the optical isolator is 0.5 dB, by removing that optical isolator the input light level to the rare earth-doped optical fiber 11 is increased by 0.5 dB. Consequently, even if the gain of the rare earth-doped optical fiber 11 is decreased by an amount equal to the loss in the optical isolator, the input light level can still be monitored accurately.

The optical band pass filter 72 shown in FIG. 15 and FIG. 16 is a filter that passes the wavelength components that carry the signal. For example, in a light transmission system using signal light in the 1550 nm band, the signal is often actually carried on light of wavelength 1552 nm or 1557 nm, but the lasers used in 1550 m band light transmission systems normally have a peak of light intensity in the vicinity of 1530 nm. In this case, the optical band pass filter 72 passes light of the wavelength of, for example, 1545 nm to 1565 nm, while cutting off light of the wavelengths in the vicinity of 1530 nm. In this kind of configuration, a drop in the gain of the rare earth-doped optical fiber caused by emission of light in the 1530 nm band can be prevented.

In FIG. 15 and FIG. 16, the optical band pass filter 72 is placed on the output side of the rare earth-doped optical fiber 12, but it can also be placed between the rare earth-doped optical fiber 11 and the rare earth-doped optical fiber 12. However, if the optical band pass filter 72 is placed between the rare earth-doped optical fiber 11 and the rare earth-doped optical fiber 12, it is necessary to use such a configuration that the excitation light will not be cut off by the optical band pass filter 72. An optical notch filter can be used in place of the optical band pass filter.

The optical amplifier shown in FIG. 15 is of forward-excitation configuration, with the excitation light supplied from the input sides of the rare earth-doped optical fibers 11 and 12.

In the configuration shown in FIG. 16, the splitter 73 branches the light output from the laser light source 74 in order to supply excitation light to the rare earth-doped optical fibers 11 and 12. The excitation light branched by the splitter 73 is guided by the respective optical couplers (wavelength division multiplexing couplers) 75 and 76, and supplied to the rare earth-doped optical fibers 11 and 12. Excitation light is supplied from the output side of the rare earth-doped optical fiber 11 and from the input side of the rare earth-doped optical fiber 12.

The optical amplifier shown in FIG. 17 is of such a configuration that excitation light is supplied from the output sides of the rare earth-doped optical fibers 11 and 12. Excitation light output from the laser light source 77 cannot pass through the optical isolator 21a in the reverse direction, so the configuration is such that the splitter 78 and the optical coupler 79 are used to make the excitation light bypass the optical coupler 21a. The splitter 78 and the optical coupler 79 are realized by, for example, respective wavelength-division multiplexing couplers.

In the above embodiments, the configurations were described assuming that the excitation light stops when the input light level drops below a threshold level, but it is also possible to have configurations in which the excitation light power is reduced. In particular, in the configurations shown in FIG. 10 and FIG. 15, in a case in which the excitation light is input to a rare earth-doped optical fiber in one stage and then is incident upon a rare earth-doped optical fiber in a succeeding stage, it is possible that even if the excitation light power is small, the rare earth-doped optical fiber in the first stage will go into the excited state. For this reason, if the excitation light power is reduced when the input light level drops below a threshold level, it is possible to put the rare earth-doped optical fiber in the first stage into the excited state and obtain gain, while suppressing the power consumption. In turn, if gain can be obtained in the rare earth-doped optical fiber in the first stage, the transition of the input light from not containing a signal to containing a signal can be reliably detected.

In addition, in the above embodiments, configurations in which the input light is amplified using rare earth-doped optical fibers have been described, but this invention is not limited to such a configuration; it is also possible to have a configuration in which an auxiliary amplifier having gain larger than the loss that occurs in the device that monitors the input light level is used in a stage preceding the main amplifier that amplifies the input light to the desired level.

This invention uses two rare earth-doped optical fibers in successive stages in an optical amplifier having an input light level monitoring function. The gain of the rare earth-doped optical fiber in the first stage is made larger than the loss that occurs in the device that monitors the input light level, so that the input light level can be monitored without amplifying the input side loss, contributing to reducing the noise in the optical amplifier and making transmission over longer distances possible.

In addition, this invention makes it possible to achieve the optimum dispersion compensation to match the transmission path. This also contributes to reducing the noise in the optical amplifier and making transmission over longer distances possible.

What is claimed is:

1. An optical amplifier comprising:

an optical fiber through which an input light travels, the input light being amplified *by Raman scattering* as the input light travels through the optical fiber [via] *and a* first pumping light traveling through the optical fiber in an opposite direction than the input light;

an optical splitter splitting off a portion of the amplified input light, the first pumping light being controlled in accordance with a monitored optical power of said split portion; and an optical fiber amplifier, optically [connected] *coupled* to the optical splitter, amplifying the input light having said portion split off therefrom [via] *by a* second pumping light.

2. An optical amplifier according to claim 1, wherein the optical fiber amplifier is a rare earth-doped optical fiber amplifier.

3. An optical fiber amplifier according to claim 1, further comprising an optical isolator between the optical splitter and the optical fiber amplifier.

4. An optical fiber amplifier according to claim 1, further comprising:

a monitor monitoring the optical power of said split portion, to thereby provide said monitored optical power.

5. An optical fiber amplifier according to claim 2, further comprising:

a monitor monitoring the optical power of said split portion, to thereby provide said monitored optical power.

6. An optical fiber amplifier according to claim 3, further comprising:

a monitor monitoring the optical power of said split portion, to thereby provide said monitored optical power.

7. An optical amplifier comprising:

an optical fiber through which an input light travels, the input light being amplified *by Raman scattering* as the input light travels through the optical fiber [via] *and a* first pumping light traveling through the optical fiber in an opposite direction than the input light;

an optical splitter splitting off a portion of the amplified input light, the first pumping light being controllable in accordance with a monitored optical power of said split portion; and an optical fiber amplifier, optically [connected] *coupled* to the optical splitter, amplifying the input light having said portion split off therefrom [via] *by a* second pumping light.

8. An optical amplifier comprising:

an optical fiber through which an input light travels, the input light being amplified *by Raman scattering* as the input light travels through the optical fiber [via] *and a* first pumping light traveling through the optical fiber in an opposite direction than the input light;

an optical splitter splitting off a portion of the amplified input light, the first pumping light being controlled in accordance with a monitored optical power of said split portion; and an optical fiber amplifier amplifying the input light having said portion split off therefrom [via] *by a* second pumping light.

9. An optical amplifier according to claim 8, wherein the optical fiber amplifier is a rare earth-doped optical fiber amplifier.

10. An optical fiber amplifier according to claim 8, further comprising an optical isolator between the optical splitter and the optical fiber amplifier.

11. An optical fiber amplifier according to claim 8, further comprising:

a monitor monitoring the optical power of said split portion, to thereby provide said monitored optical power.

12. An optical fiber amplifier according to claim 9, further comprising:

a monitor monitoring the optical power of said split portion, to thereby provide said monitored optical power.

13. An optical fiber amplifier according to claim 10, further comprising:

a monitor monitoring the optical power of said split portion, to thereby provide said monitored optical power.

14. An optical amplifier comprising:

an optical fiber through which an input light travels, the input light being amplified *by Raman scattering* as the input light travels through the optical fiber [via] *and a* first pumping light traveling through the optical fiber in an opposite direction than the input light;

an optical splitter splitting off a portion of the amplified input light, the first pumping light being controllable in accordance with a monitored optical power of said split portion; and an optical fiber amplifier amplifying the input light having said portion split off therefrom [via] *by a* second pumping light.

15. An apparatus comprising:

an optical amplifier including an optical fiber through which an input light travels, the input light being amplified *by Raman scattering* as the input light travels through the optical fiber [via] *and a* first pumping light traveling through the optical fiber in an opposite direction than the input light, an optical splitter splitting off a portion of the amplified input light, the first pumping light being controlled in accordance with a monitored optical power of said split portion; and an optical fiber amplifier amplifying the input light having said portion split off therefrom [via] *by a* second pumping light.

16. An apparatus comprising:

an optical amplifier including an optical fiber through which an input light travels, the input light being amplified *by Raman scattering* as the input light travels through the optical fiber [via] *and a* first pumping light traveling through the optical fiber in an opposite direction than the input light, an optical splitter splitting off a portion of the amplified input light, the first pumping light being controlled in accordance with a monitored optical power of said split portion; and an erbium doped fiber amplifier (EDFA) including an erbium doped fiber (EDF) through which the input light having said portion split off therefrom travels and is amplified [via] *by a* second pumping light traveling through the EDF.

17. An apparatus comprising:

an optical amplifier including an optical fiber through which an input light travels, the input light being amplified *by Raman scattering* as the input light travels through the optical fiber [via] *and a* first pumping light traveling through the optical fiber in an opposite direction than the input light, means for splitting off a portion of the amplified input light, the first pumping light being controlled in accordance with a monitored optical power of said split portion; and an optical fiber amplifier amplifying the input light having said portion split off therefrom [via] *by a* second pumping light.

18. An apparatus comprising:

an optical amplifier including an optical fiber through which an input light travels, the input light being amplified *by Raman scattering* as the input light travels through the optical fiber [via] *and a* first pumping light traveling through the optical fiber in an opposite direction than the input light, means for splitting off a portion of the amplified input light, the first pumping light being controlled in accordance with a monitored optical power of said split portion; and an erbium doped fiber amplifier (EDFA) including an erbium doped fiber (EDF) through which the input light having said portion split off therefrom travels and is amplified [via] *by a* second pumping light traveling through the EDF.

*19. An apparatus comprising:*

*an optical splitter splitting off a portion of an input light having been amplified by Raman scattering as the input light traveled through an optical fiber and a first pumping light traveling through the optical fiber in an opposite direction than the input light, the first pumping light being controlled in accordance with a monitored optical power of said split portion; and*

*an optical fiber amplifier, optically coupled to the optical splitter, amplifying the input light having said portion split off therefrom by a second pumping light.*

*20. An apparatus according to claim 19, wherein the optical fiber amplifier is a rare earth-doped optical fiber amplifier.*

*21. An apparatus according to claim 19, further comprising an optical isolator between the optical splitter and the optical fiber amplifier.*

*22. An apparatus according to claim 19, further comprising:*

*a monitor monitoring the optical power of said split portion, to thereby provide said monitored optical power.*

*23. An apparatus according to claim 20, further comprising:*

*a monitor monitoring the optical power of said split portion, to thereby provide said monitored optical power.*

*24. An apparatus according to claim 21, further comprising:*

*a monitor monitoring the optical power of said split portion, to thereby provide said monitored optical power.*

*25. An apparatus according to claim 19, wherein the optical fiber is an erbium doped fiber.*

*26. An apparatus according to claim 19, wherein there are no optical components between the optical splitter and the optical fiber amplifier.*

*27. An apparatus comprising:*

*an optical splitter splitting off a portion of an input light having been amplified by Raman scattering as the input light traveled through an optical fiber and a first pumping light traveling through the optical fiber in an opposite direction than the input light, the first pumping light being controlled in accordance with a monitored optical power of said split portion; and*

*an optical fiber amplifier amplifying the input light having said portion split off therefrom by a second pumping light.*

*28. An apparatus according to claim 27, wherein the optical fiber amplifier is a rare earth-doped optical fiber amplifier.*

*29. An apparatus according to claim 27, further comprising an optical isolator between the optical splitter and the optical fiber amplifier.*

*30. An apparatus according to claim 28, further comprising:*

*a monitor monitoring the optical power of said split portion, to thereby provide said monitored optical power.*

*31. An apparatus according to claim 29, further comprising:*

*a monitor monitoring the optical power of said split portion, to thereby provide said monitored optical power.*

*32. An apparatus according to claim 27, wherein the optical fiber is an erbium doped fiber.*

*33. An apparatus according to claim 27, wherein there are no optical components between the optical splitter and the optical fiber amplifier.*

*34. An apparatus comprising:*

*an optical splitter splitting off a portion of an input light having been Raman amplified by a first pumping light traveling in an opposite direction than, and along the same travel path as, the input light, the first pumping light being controlled in accordance with a monitored optical power of said split portion; and*

*an optical fiber amplifier, optically coupled to the optical splitter, amplifying the input light having said portion split off therefrom by a second pumping light.*

*35. An apparatus according to claim 34, further comprising an optical isolator between the optical splitter and the optical fiber amplifier.*

*36. An apparatus according to claim 34, further comprising:*

*a monitor monitoring the optical power of said split portion, to thereby provide said monitored optical power.*

*37. An apparatus according to claim 35, further comprising:*

*a monitor monitoring the optical power of said split portion, to thereby provide said monitored optical power.*

*38. An apparatus according to claim 34, wherein there are no optical components between the optical splitter and the optical fiber amplifier.*

*39. An optical amplifier according to claim 1, wherein the optical fiber is doped with a rare earth element.*

*40. An optical amplifier according to claim 7, wherein the optical fiber is doped with a rare earth element.*

*41. An optical amplifier according to claim 8, wherein the optical fiber is doped with a rare earth element.*

*42. An optical amplifier according to claim 14, wherein the optical fiber is doped with a rare earth element.*

*43. An apparatus according to claim 15, wherein the optical fiber is doped with a rare earth element.*

*44. An apparatus according to claim 16, wherein the optical fiber is doped with a rare earth element.*

*45. An apparatus according to claim 17, wherein the optical fiber is doped with a rare earth element.*

*46. An apparatus according to claim 18, wherein the optical fiber is doped with a rare earth element.*

*47. An apparatus for receiving an optical signal transmitted through an optical fiber in a first direction, comprising:*

*a pumping light source to output a pumping light to the optical fiber so that the pumping light travels through the optical fiber in a second direction opposite to the first direction for Raman scattering;*

*an optical coupler to receive the optical signal from the optical fiber and to output the received optical signal and a monitor signal of the received optical signal, the pumping light source being controlled in accordance with the monitor signal to thereby control the pumping light output by the pumping light source; and*

*an optical amplifier to amplify the received optical signal output from the optical coupler.*

*48. An apparatus according to claim 47, wherein the optical fiber is doped with a rare earth element.*

*49. An optical transmission system, comprising:*

*an optical transmitting station to transmit an optical signal through an optical fiber in a first direction; and*

*an optical repeater, coupled to the optical fiber, including:*

*a pumping light source to output a pumping light to the optical fiber so that the pumping light travels through the optical fiber in a second direction opposite to the first direction for Raman scattering,*

*an optical coupler to receive the optical signal from the optical fiber and to output the received optical signal and a monitor signal of the received optical signal, the pumping light source being controlled in accordance with the monitor signal to thereby control the pumping light output by the pumping light source and*

*an optical amplifier to amplify the received optical signal from the optical coupler and to output the amplified optical signal.*

*50. An optical transmission system, according to claim 49, wherein the optical fiber is doped with an rare earth element.*

*51. An optical transmission system, comprising:*

*an optical repeater, coupled to an optical fiber through which an optical signal is transmitted in a first direction, including:*

*a pumping light source to output a pumping light to the optical fiber so that the pumping light travels through the optical fiber in a second direction opposite to the first direction for Raman scattering,*

*an optical coupler to receive the optical signal from the optical fiber and to output the received optical signal and a monitor signal of the received optical signal, the pumping light source being controlled in accordance with the monitor signal to thereby control the pumping light output by the pumping light source, and*

*an optical amplifier to amplify the received optical signal output from the optical coupler; and*

*an optical receiver, operatively coupled to the optical repeater, to receive the amplified optical signal.*

* * * * *